United States Patent
Song et al.

(10) Patent No.: US 11,727,786 B2
(45) Date of Patent: Aug. 15, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Hoyoon Song, Suwon-si (KR); Seungjun Lee, Suwon-si (KR); Sangyoul Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/738,161

(22) Filed: May 6, 2022

(65) Prior Publication Data

US 2023/0068073 A1 Mar. 2, 2023

Related U.S. Application Data

(63) Continuation of application No. PCT/KR2022/005278, filed on Apr. 12, 2022.

(30) Foreign Application Priority Data

Aug. 31, 2021 (KR) .................. 10-2021-0115387

(51) Int. Cl.
*G08B 21/18* (2006.01)
(52) U.S. Cl.
CPC ......... *G08B 21/187* (2013.01); *G08B 21/182* (2013.01)
(58) Field of Classification Search
CPC .................. G08B 21/187; G08B 21/182
See application file for complete search history.

(56) References Cited

U.S. PATENT DOCUMENTS 8,511,104 B2 * 8/2013 Lee .................. F25D 29/00
  62/89
9,103,265 B2 * 8/2015 Okamoto ............... B60K 35/00
(Continued)

FOREIGN PATENT DOCUMENTS

KR 10-1998-056796 9/1998
KR 10-0202603 B1 6/1999
(Continued)

OTHER PUBLICATIONS

International Search Report dated Jul. 26, 2022 in International Patent Application No. PCT/KR2022/005278 (3 pages; 3 pages English translation).
(Continued)

*Primary Examiner* — Hoi C Lau
(74) *Attorney, Agent, or Firm* — Staas & Halsey LLP

(57) ABSTRACT

An electronic apparatus includes a memory configured to store an artificial intelligence model, and a processor configured to obtain data associated with a fan motor of the electronic apparatus, obtain a freezing degree of the fan motor by inputting the obtained data associated with the fan motor to the artificial intelligence model which is trained to output the freezing degree of the fan motor based on the inputting of the obtained data associated with the fan motor, identify whether to perform an operation in relation to the obtained freezing degree of the fan motor, and provide, based on identifying that the operation in relation to the obtained freezing degree of the fan motor is to be performed, notification information.

15 Claims, 30 Drawing Sheets

(56) References Cited

U.S. PATENT DOCUMENTS

| | | | | |
|---|---|---|---|---|
| 9,644,886 | B2* | 5/2017 | Shim | F25D 29/00 |
| 2009/0322470 | A1* | 12/2009 | Yoo | A47B 88/457 |
| | | | | 340/3.1 |
| 2012/0096887 | A1* | 4/2012 | Cho | F25D 21/08 |
| | | | | 62/276 |
| 2015/0260450 | A1* | 9/2015 | Marutani | G08B 21/02 |
| | | | | 62/131 |
| 2023/0068073 | A1* | 3/2023 | Song | G08B 21/187 |

FOREIGN PATENT DOCUMENTS

| | | |
|---|---|---|
| KR | 10-0403027 | 10/2003 |
| KR | 10-0803574 B1 | 2/2008 |
| KR | 10-2011-0083916 A | 7/2011 |
| KR | 10-2015-0032404 | 3/2015 |
| KR | 10-1641852 B1 | 7/2016 |
| KR | 10-1917293 B1 | 1/2019 |
| KR | 10-2161416 B1 | 9/2020 |
| WO | 2008/044847 A1 | 4/2008 |

OTHER PUBLICATIONS

Written Opinion dated Jul. 26, 2022 in International Patent Application No. PCT/KR2022/005278 (4 pages; 4 pages English translation).

* cited by examiner

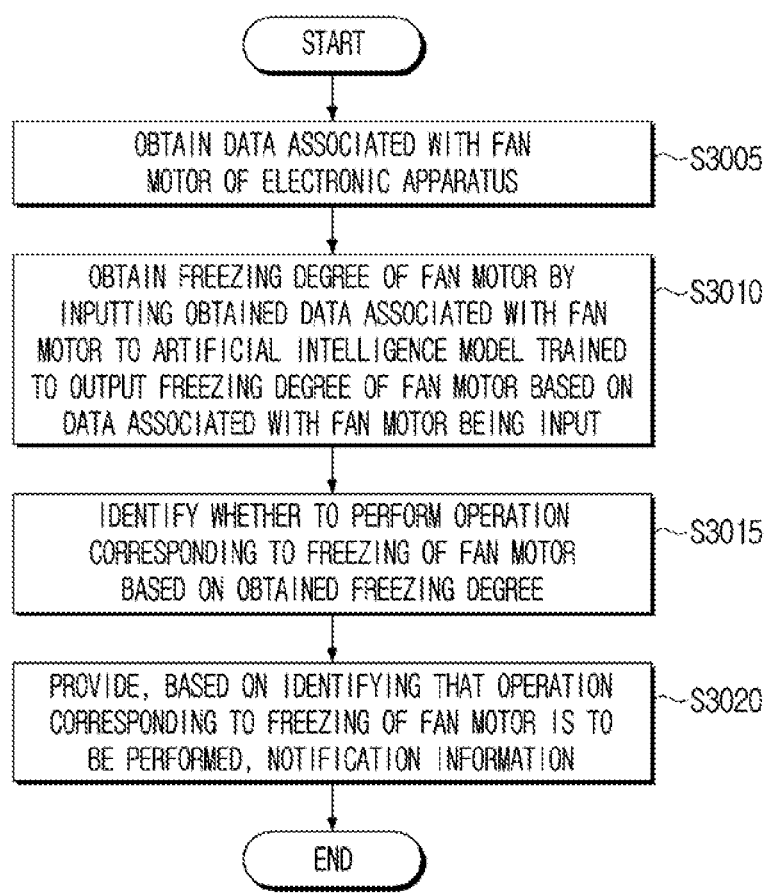

ELECTRONIC APPARATUS AND CONTROLLING METHOD THEREOF

CROSS REFERENCE TO THE RELATED APPLICATION

This application is a continuation application, under 35 U.S.C. § 111(a), of International Application No. PCT/KR2022/005278, filed Apr. 12, 2022 which claims priority to Korean Patent Application No. 10-2021-0115387, filed Aug. 31, 2021, the entire disclosures of all of which are herein incorporated by reference as a part of this application.

BACKGROUND

Field

The disclosure relates to an electronic apparatus and a controlling method thereof. More particularly, the disclosure relates to an electronic apparatus which predicts a freezing degree of a fan motor based on data associated with the fan motor and a controlling method thereof.

Description of the Related Art

In a refrigerator, cold air is generated through continuous repetition of compression, condensation, expansion, evaporation of a refrigerant, and the cold air may be transferred to each chamber according to a rotation of a fan motor. Through the above, food may be stored cold.

A speed of the fan motor may be affected by various factors that include voltage or current. Based on the above, even if an amount of current going into the fan motor is the same, the speed of the fan motor may be different from another by the various factors. Specifically, based on the fan motor being gradually frozen, a speed of rotation of the fan motor may become gradually slower, and eventually when the fan motor is completely stopped, a performance of a refrigerator is gradually deteriorated and the refrigerator may fail or a lifespan of the refrigerator may be reduced.

Normally, a defrosting function may be appropriately executed and a freezing of the fan motor may be prevented, However, when an amount of freeze is greater than the amount which can be defrosted, the fan motor is gradually slowed, and a phenomenon of the performance of the refrigerator deteriorating may occur when a user continuously uses the same unknowingly. The user may eventually recognize that there is freezing only after the fan motor is stopped.

Based on freezing being formed over a long period of time, efficiency of the refrigerator may deteriorate during the time freezing occurs. Further, when the user realizes the freezing of the fan motor, it may already be in a state in which refrigeration efficiency is deteriorated because it is already after freezing has occurred, and the food in storage may be spoiled and in a decomposed state. In addition, frost may be generated in the refrigerator. Accordingly, if the user is late in realizing a freezing time point of the fan motor, there may be the problem of dissatisfaction and trust concerning the product deteriorating, and the lifespan of the refrigerator reducing.

SUMMARY

Aspects of the disclosure are to address at least the above-mentioned problems and/or disadvantages and to provide at least the advantages described below. Accordingly, an aspect of the disclosure is to provide an electronic apparatus which obtains a freezing degree of a fan motor based on data associated with the fan motor, and performs an operation corresponding to the obtained freezing degree and a controlling method thereof.

According to an embodiment, an electronic apparatus includes a memory configured to store an artificial intelligence model, and a processor configured to obtain data associated with a fan motor of the electronic apparatus, obtain a freezing degree of the fan motor by inputting the obtained data associated with the fan motor to the artificial intelligence model which is trained to output the freezing degree of the fan motor based on the inputting of the obtained data associated with the fan motor, identify whether to perform an operation in relation to the obtained freezing degree of the fan motor, and provide, based on identifying that the operation in relation to the obtained freezing degree of the fan motor is to be performed, notification information.

The processor may be configured to perform, based on the obtained freezing degree of the fan motor being greater than or equal to a threshold value, the operation.

The operation may include at least one from among an operation of providing the notification information or an operation of executing a defrosting function.

The electronic apparatus may further include a fan motor, and the processor may be configured to execute, based on the obtained freezing degree of the fan motor being greater than or equal to the threshold value, the defrosting function by supplying heat from a heat source to the fan motor to remove freezing generated at the fan motor.

The data associated with the fan motor may include at least one from among a duty cycle, a driving voltage, a power consumption, a rotation speed, or a wind strength of the fan motor.

The notification information may include at least one from among freezing information, guide information on a defrosting function, execution information on a defrosting function, or failure information, the freezing information may include at least one from among a freezing degree or an estimated freezing time, the guide information on the defrosting function may include guide information to select whether to execute the defrosting function, and the execution information on the defrosting function may include at least one from among information showing that the defrosting function is being executed and an estimated defrosting complete time.

The processor may be configured to provide, based on the obtained freezing degree of the fan motor being greater than or equal to a first threshold value and less than a second threshold value, the freezing information.

The processor may be configured to provide, based on the obtained freezing degree of the fan motor being greater than or equal to the second threshold value and less than a third threshold value, the guide information on the defrosting function, and execute, based on a user input being received based on the guide information, the defrosting function.

The processor may be configured to provide, based on the defrosting function being executed, the execution information on the defrosting function.

The processor may be configured to execute, based on the obtained freezing degree of the fan motor being greater than or equal to the third threshold value and less than a fourth threshold value, the defrosting function, and provide, based on the obtained freezing degree of the fan motor being greater than or equal to the fourth threshold value, the failure information.

According to an embodiment, a controlling method of an electronic apparatus includes obtaining data associated with a fan motor of the electronic apparatus, obtaining a freezing degree of the fan motor by inputting the obtained data associated with the fan motor to an artificial intelligence model which is trained to output the freezing degree of the fan motor based on the inputting of the obtained data associated with the fan motor being input, identifying whether to perform an operation in relation to the obtained freezing degree of the fan motor, and providing, based on identifying that the operation in relation to the obtained freezing of the fan motor is to be performed, notification information.

The control method may further include performing, based on the obtained freezing degree being greater than or equal to a threshold value, the operation.

The operation may include at least one from among an operation providing of the notification information which pertains to a freezing status of the fan motor or an operation of executing a defrosting function.

The control method may further include executing, based on the obtained freezing degree being greater than or equal to a threshold value, the defrosting function by supplying heat from a heat source to the fan motor to remove freezing generated at the fan motor.

The data associated with the fan motor may include at least one from among a duty cycle, a driving voltage, a power consumption, a rotation speed, or a wind strength of the fan motor.

The notification information may include at least one from among freezing information, guide information on a defrosting function, execution information on a defrosting function, or failure information, the freezing information may include at least one from among a freezing degree or an estimated freezing time, the guide information on the defrosting function may include guide information to select whether to execute the defrosting function, and the execution information on the defrosting function may include at least one from among information showing that the defrosting function is being executed and an estimated defrosting complete time.

The providing the notification information may include providing, based on the obtained freezing degree being greater than or equal to a first threshold value and less than a second threshold value, the freezing information.

The providing the notification information comprises providing, based on the obtained freezing degree being greater than or equal to the second threshold value and less than a third threshold value, the guide information on the defrosting function, and the control method may further include executing, based on a user input being received based on the guide information, the defrosting function.

The providing the notification information may include providing, based on the defrosting function being executed, the execution information on the defrosting function.

The control method may further include executing, based on the obtained freezing degree being greater than or equal to the third threshold value and less than a fourth threshold value, the defrosting function, and the providing the notification information may include providing, based on the obtained freezing degree being greater than or equal to the fourth threshold value, the failure information.

BRIEF DESCRIPTION OF DRAWINGS

The above and/or other aspects of the disclosure will be more apparent by describing certain embodiments of the disclosure with reference to the accompanying drawings, in which:

FIG. 30 is a flowchart illustrating a controlling method of an electronic apparatus according to an embodiment.

DETAILED DESCRIPTION

Figure 1:
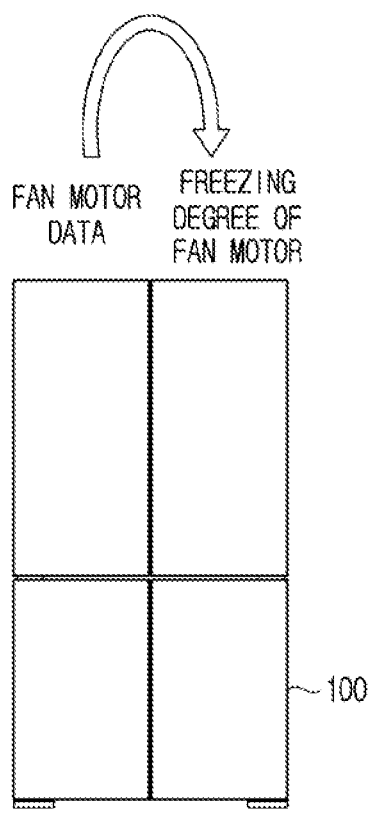
FIG. 1 is a diagram illustrating an operation of an electronic apparatus obtaining a freezing degree according to an embodiment.

Embodiments described in the specification and configurations illustrated in the drawings are merely preferred examples of the embodiments of the disclosure, and may be modified in various different ways at the time of filing of the present application to replace the embodiments and drawings of the specification.

The disclosure will be described in detail below with reference to the accompanying drawings.

Terms used in describing various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

The expression at least one of A and/or B is to be understood as indicating at least one of "A" or "B" or "A and B."

Expressions such as "first," "second," "1st," "2nd," or so on used in the disclosure may be used to refer to various elements regardless of order and/or importance, and may be used only to distinguish one element from another, but not limit the corresponding elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms "module" or "part" used in the embodiments herein perform at least one function or operation, and may be implemented with a hardware or software, or a combination of hardware and software. Further, a plurality of "modules" or a plurality of "parts", except for a "module" or a "part" which needs to be implemented to a specific hardware, may be integrated to at least one module and implemented in at least one processor (not shown).

In this disclosure, the term "user" may refer to a person using an electronic apparatus or a device (e.g., artificial intelligence electronic device) using an electronic apparatus.

An embodiment of the disclosure will be described in greater detail below with reference to the accompanied drawings.

FIG. 1 is a diagram illustrating an operation of an electronic apparatus 100 of the disclosure obtaining a freezing degree.

Referring to FIG. 1, the electronic apparatus 100 may obtain a freezing degree of a fan motor based on fan motor data. Here, the electronic apparatus 100 may mean an electronic apparatus which executes the fan motor and a cooling function. For example, the electronic apparatus 100 may mean a refrigerator. Here, fan motor data may mean data associated with the fan motor. The fan motor data may include at least one from among a duty cycle, a driving voltage, a power consumption, a rotation speed, or a wind strength of the fan motor.

The electronic apparatus 100 may obtain the freezing degree of the fan motor on its own based on data associated with the fan motor (or, fan motor data). Specifically, the electronic apparatus 100 may store a determination standard for obtaining the freezing degree of the fan motor based on the fan motor data. Further, the electronic apparatus 100 may obtain data associated with the fan motor in real-time, and monitor the freezing degree of the fan motor.

Figure 2:
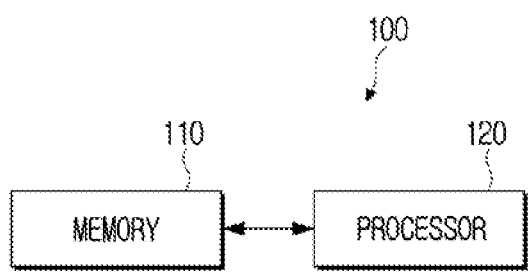
FIG. 2 is a block diagram illustrating an electronic apparatus according to an embodiment.

FIG. 2 is a block diagram illustrating the electronic apparatus 100 according to an embodiment.

Referring to FIG. 2, the electronic apparatus 100 may include a memory 110 and a processor 120.

The memory 110 may be implemented as an internal memory such as a read-only memory (ROM) or a random access memory (RAM) included in the processor 120 (e.g., an electrically erasable programmable read-only memory (EEPROM)), or implemented as a separate memory from the processor 120. In this case, the memory 110 may be implemented in the form of a memory embedded in the electronic apparatus 100 according to a data storage use, or in the form of a memory detachable from the electronic apparatus 100. For example, the data for the driving of the electronic apparatus 100 may be stored in a memory embedded in the electronic apparatus 100, and data for an expansion function of the electronic apparatus 100 may be stored in a memory detachable from the electronic apparatus 100.

The memory embedded in the electronic apparatus 100 may be implemented as at least one of a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)), and in the case of a memory detachable from the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The memory 110 may be configured to store an artificial intelligence model. Here, the artificial intelligence model may be a model trained to output the freezing degree of the fan motor when data associated with the fan motor is input. Specifically, the artificial intelligence model may be a model in which data associated with the fan motor in a normal state and data associated with the fan motor in an abnormal state is used as learning data. Further, output data may be whether freezing of the fan motor has occurred or the freezing degree of the fan motor. Accordingly, the artificial intelligence model may be configured to output, based on data associated with the fan motor being input as input data, the freezing degree of the fan motor as output data. Here, the abnormal state may mean a state in which the fan motor is frozen.

The processor 120 may be configured to perform the overall control operation of the electronic apparatus 100. Specifically, the processor 120 may function as controlling the overall operation of the electronic apparatus 100.

The processor 120 may be implemented as a digital signal processor (DSP) for processing a digital image signal, a microprocessor, and a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a graphics-processing unit (GPU) or a communication processor (CP), an ARM processor, or the like, or may be defined by the corresponding term. In addition, the processor 120 may be implemented as a System on Chip (SoC) or a large scale integration (LSI) in which a processing algorithm is embedded, and may be implemented in the form of a field programmable gate array (FPGA). In addition, the processor 120 may be configured to perform various functions by executing computer executable instructions which are stored in the memory 110.

The processor 120 may be configured to obtain data associated with the fan motor of the electronic apparatus 100, obtain the freezing degree of the fan motor by inputting the obtained data associated with the fan motor to the artificial intelligence model, identify whether to perform an operation corresponding to the freezing of the fan motor based on the obtained freezing degree, and based on identifying that the operation corresponding to the freezing of the fan motor is to be performed, provide notification information.

Figure 3:
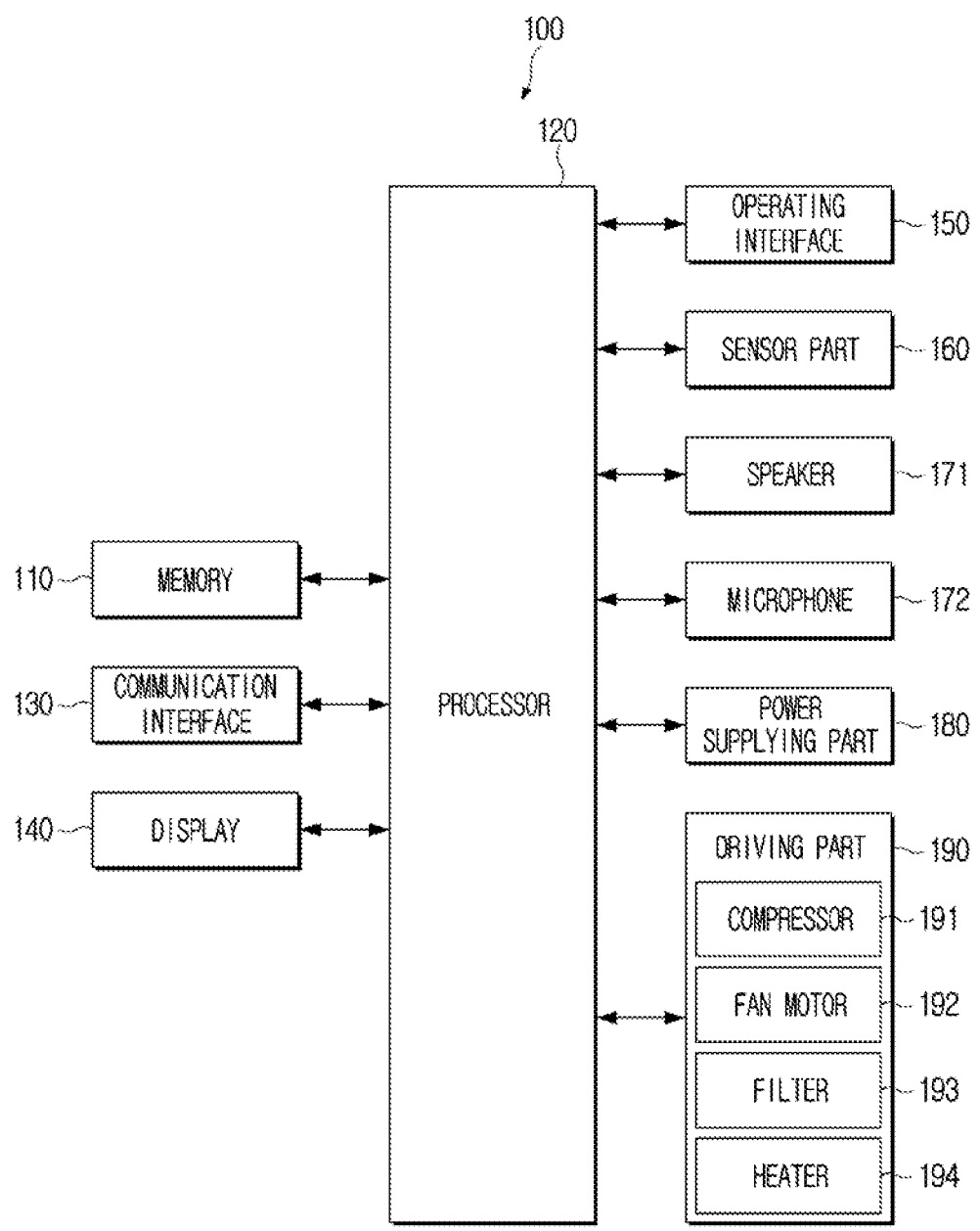
FIG. 3 is a block diagram illustrating a detailed configuration of the electronic apparatus of FIG. 2 according to an embodiment.

Here, the fan motor may be a configuration included in the electronic apparatus 100, and a fan motor 192 of FIG. 3

The data associated with the fan motor may mean various data used in analyzing the freezing of the fan motor. According to an embodiment, the processor 120 may be configured to measure (or, monitor) the data associated with the fan motor in real-time. According to another embodiment, the processor 120 may be configured to measure the data associated with the fan motor according to a pre-set cycle. For example, the pre-set cycle may be one hour. The processor 120 may be configured to identify a state of the fan motor by obtaining data associated with the fan motor. Here, an operation for identifying the state of the fan motor may be an operation for determining whether the fan motor is operating normally.

The data associated with the fan motor may include at least one from among the duty cycle, the driving voltage, the power consumption, the rotation speed, or the wind strength of the fan motor.

Here, the data associated with the fan motor may be described as fan motor data, measurement data, collected data, operating data, driving data, and the like.

The processor 120 may be configured to obtain the freezing degree of the fan motor based on a difference of data in the normal state and data in the abnormal state. Here, the abnormal state may mean the state in which the fan motor is frozen. The operation for analyzing the data associated with the fan motor may be described in FIG. 5 to FIG. 10.

The freezing degree may mean a value showing the degree to which the fan motor is currently frozen. In addition, the freezing degree may be described as a frozen state, a freezing likelihood, and the like.

The processor 120 may be configured to obtain the freezing degree of the fan motor based on the obtained data associated with the fan motor. Specifically, the processor 120 may be configured to use the artificial intelligence model of which training is already completed. The artificial intelligence model may be a model trained to output the freezing degree of the fan motor based on the data associated with the fan motor being input. Here, the artificial intelligence model may be configured to obtain time-series feature data or time-series vector data based on the data associated with the fan motor. Further, the artificial intelligence model may be configured to output the freezing degree of the fan motor based on the time-series feature data or the time-series vector data.

According to an embodiment, the artificial intelligence model completed in training may be stored in the electronic apparatus 100.

According to another embodiment, the artificial intelligence model completed in training may be stored in an external server 200. Embodiments associated therewith will be described in FIG. 19 to FIG. 22, and FIG. 25 to FIG. 29.

The processor 120 may be configured to identify the state of the fan motor based on the obtained freezing degree. The state of the fan motor may be identified. Specifically, the processor 120 may be configured to determine how frozen the fan motor is. Further, the processor 120 may be configured to perform a pre-set operation based on the freezing degree of the fan motor.

The processor 120 may be configured to perform, based on the obtained freezing degree being greater than or equal to a threshold value, the operation corresponding to the freezing of the fan motor.

The threshold value may be a standard for differentiating the normal state and the abnormal state.

Based on the freezing degree being less than the threshold value, the processor 120 may be configured to identify that the fan motor is in the normal state. In addition, based on the freezing degree being greater than or equal to the threshold value, the processor 120 may be configured to identify that the fan motor is in the abnormal state. Accordingly, the processor 120 may be configured to perform the pre-set operation to solve the abnormal state. Here, the pre-set operation may mean an operation corresponding to the freezing of the fan motor. For example, the threshold value for distinguishing the normal state and the abnormal state may mean a first threshold value in FIG. 11. The pre-set operation may be varied according to the freezing degree.

The operation corresponding to the freezing degree of the fan motor may include at least one from among an operation for providing notification information or an operation for executing a defrosting function.

The notification information may mean specific information provided to a user, and may mean information associated with the freezing of the fan motor The notification information may include at least one from among freezing information, guide information on the defrosting function, execution information on the defrosting function, or failure information. Here, the freezing information may be information showing the frozen state of the fan motor. Specifically, the freezing information may include at least one from among the freezing degree or an estimated freezing time.

The processor 120 may be configured to obtain the freezing degree based on the data associated with the fan motor, and additionally obtain the estimated freezing time. The estimated freezing time may mean an estimated time taken until the fan motor is in a fully frozen and no longer rotated or until the fan motor is incapable of rotating. The artificial intelligence model may be configured to output, based on the data associated with the fan motor being input as input data, at least one from among the freezing degree or the estimated freezing time as output data. An example associated with freezing information may be described in FIG. 15.

The guide information on the defrosting function may include guide information for selecting whether to execute the defrosting function.

The guide information on the defrosting function may include a description asking the user whether to execute the defrosting function. The user may input a user input selecting whether to execute the defrosting function at this time to the electronic apparatus 100 based on the provided guide information on the defrosting function. Further, based on the user input for executing the defrosting function being received, the processor 120 may be configured to execute the defrosting function. An example associated with the guide information on the defrosting function may be described in FIG. 16.

The execution information on the defrosting function may include at least one from among information showing that the defrosting function is being executed, and an estimated defrosting complete time.

The execution information on the defrosting function may be information provided after the defrosting function is executed. Here, the execution information on the defrosting function may include information for notifying the user that the defrosting function is currently being executed. In addition, the processor 120 may be configured to obtain the estimated defrosting complete time based on current data associated with the fan motor and information associated with the defrosting function. Here, the information associated with the defrosting function may include an output level of the defrosting function. For example, based on the defrosting function being a method of supplying a heat source, the output level of the defrosting function may mean an output level of the heat source. The estimated defrosting complete time may mean the time taken until the freezing degree of the fan motor is less than or equal to the threshold value (e.g., a first threshold value of FIG. 11). Alternatively, the estimated defrosting complete time may mean the time taken for the defrosting function to be performed. An example associated with the execution information on the defrosting function may be described in FIG. 17.

The failure information may mean information for notifying that the fan motor is in a failed state. The processor 120 may be configured to identify whether the fan motor has failed based on the data associated with the fan motor or the freezing degree. Further, based on the fan motor being identified as having failed, the processor 120 may provide the failure information. An example associated with the failure information will be described in FIG. 18.

The operation for providing notification information may mean at least one from among an operation for displaying an image form through a display or an operation for outputting in audio form through a speaker. Here, the notification information provided in the image form may include at least one from among a logo, an icon, and text information associated with the freezing of the fan motor.

According to an embodiment, the notification information may be provided to the user by the electronic apparatus 100. According to another embodiment, the notification information may be provided to the user by a terminal device 300. The description associated therewith will be described in FIG. 23 to FIG. 28.

The defrosting function may mean supplying an energy source to the frozen fan motor. For example, the defrosting function may mean defrosting the frozen fan motor by supplying the heat source. Here, the defrosting function may be described as a heat source supplying function. According to an embodiment, the defrosting function may be implemented in the form of supplying a different energy which is not the supplying of the heat source.

The processor 120 may be configured to execute, based on the obtained freezing degree being greater than or equal to the threshold value, the defrosting function by supplying the heat source to the fan motor to remove the freezing formed at the fan motor.

The threshold value may be a standard for determining whether to execute the defrosting function. For example, the threshold value may mean a third threshold value in FIG. 11.

The processor 120 may be configured to use a plurality of threshold values (e.g., the first threshold value to a fourth threshold value) so that various operations may be performed based on the freezing degree.

The processor 120 may be configured to provide, based on the obtained freezing degree being greater than or equal to the first threshold value and less than the second threshold value, the freezing information.

In addition, the processor 120 may be configured to provide, based on the obtained freezing degree being greater than or equal to the second threshold value and less than the third threshold value, the guide information on the defrosting function, and execute, based on the user input being received based on the guide information, the defrosting function.

The processor 120 may be configured to provide, based on the defrosting function being executed, the execution information on the defrosting function.

In addition, the processor 120 may be configured to execute, based on the obtained freezing degree being greater than or equal to the third threshold value and less than the fourth threshold value, the defrosting function, and provide, based on the obtained freezing degree being greater than or equal to the fourth threshold value, the failure information.

The detailed description associated with the plurality of threshold values will be described in FIG. 11 to FIG. 12.

The processor 120 may be configured to determine whether the defrosting function is operating properly after the defrosting function is executed. Specifically, the processor 120 may be configured to obtain the freezing degree of the fan motor again after a pre-set time after the defrosting function is executed. Further, based on the freezing degree not falling to less than or equal to the threshold value despite the defrosting function having been executed, the processor 120 may be configured to identify that the defrosting function is not operating normally. The operation associated therewith will be described in FIG. 14.

The electronic apparatus 100 according to various embodiments may collect data associated with the fan motor, and obtain the freezing degree of the fan motor based on the collected data. Based on checking the freezing degree of the fan motor in real-time or by a pre-set cycle, performance of the electronic apparatus may be maintained by checking the state of the fan motor. Specifically, considering that the freezing of the fan motor is slowly formed over time and eventually reaches to being fully frozen, it may be effective in maintaining the performance of the fan motor when the time point at which the freezing of the fan motor is started is identified as quickly as possible.

In the above, although only the simple configurations comprising the electronic apparatus 100 have been illustrated and described, but various configurations may be additionally provided at implementation. The above will be described below with reference to FIG. 3.

FIG. 3 is a block diagram illustrating a detailed configuration of the electronic apparatus 100 of FIG. 2.

Referring to FIG. 3, the electronic apparatus 100 may include at least one from among the memory 110, the processor 120, a communication interface 130, a display 140, an operating interface 150, a sensor part 160, a speaker 171, a microphone 172, a power supplying part 180, or a driving part 190

With respect to operations which are the same as that described above from among the operations of the memory 110 and the processor 120, redundant descriptions thereof will be omitted.

The communication interface 130 may be a configuration for performing communication with an external device of various types according a communication method of various types. The communication interface 130 may include a wireless communication module or a wired communication module. Here, the respective communication modules may be implemented to at least one hardware chip form.

The wireless communication module may be a module for communicating with the external device via wireless communication. For example, the wireless communication module may include at least one module from among a Wi-Fi module, Bluetooth module, an infrared communication module, or other communication modules.

The wired communication module may be a module for communicating with the external device via wired communication. For example, the wired communication module may include at least one from among a local area network (LAN) module, an Ethernet module, a pair cable, a coaxial cable, an optical fiber cable, or an ultra wide-band (UWB) module.

The electronic apparatus 100 may be configured to perform communication with various external devices by using the communication interface 130. Here, the external device may include a display device such as a television (TV), an image processing device such as a set-top box, a control device such as a remote control and an external server, a sound output device such as a Bluetooth speaker, a home appliance such as a lighting device, a smart light-bulb, a smart plug, a smart cleaning device, and a smart refrigerator, a server such as an IOT home manager, and the like.

The display 140 may be implemented as a display of various forms such as a liquid crystal display (LCD), an organic light emitting diodes (OLED) display, and a plasma display panel (PDP). In the display 140, a driving circuit which may be implemented in the form of an a-si thin film transistor (TFT), a low temperature poly silicon (LTPS) TFT, an organic TFT (OTFT), and the like, a backlight unit, and the like may be included. The display 140 may be implemented as a touch screen coupled with a touch sensor, a flexible display, a third-dimensional display (3D display), or the like. In addition, according to an embodiment of the disclosure, the display 140 may include not only a display panel which outputs an image but also a bezel which houses the display panel. Specifically, according to an embodiment of the disclosure, the bezel may include a touch sensor (not shown) for detecting a user interaction.

The operating interface 150 may be implemented as a device such as a button, a touch pad, a mouse and a keyboard, or implemented also as a touch screen capable of performing the above-described display function and the operation input function. Here, the button may be a button of various types such as a mechanical button, a touch pad, or a wheel which is formed at a random area at a front surface part or a side surface part, a rear surface part, or the like of an exterior of a main body of the electronic apparatus 100.

The sensor part 160 may be configured to sense data associated with the electronic apparatus 100. The sensor part 160 may include at least one from among a temperature sensor, a humidity sensor, a door sensor, an image sensor, a pressure sensor, and a voltage (or, current) measurement sensor.

The speaker 171 may be an element configured to output not only various audio data, but also various notification sounds, voice messages, or the like.

The microphone 172 may be a configuration for receiving a user voice or other sounds and converting to audio data. The microphone 172 may be configured to receive the user voice in an activated state. For example, the microphone 172 may be formed integrally at a top side or a front surface direction, a side surface direction, or the like of the electronic apparatus 100. The microphone 172 may include various configurations such as a microphone configured to collect the user voice in an analog form, an amplifier circuit configured to amplify the collected user voice, an A/D converter circuit configured to sample the amplified user voice and convert to a digital signal, a filter circuit configured to remove a noise component from the converted digital signal, and the like.

The power supplying part 180 may be configured to supply power to the elements of the refrigerator by the control of the processor 120. The power supplying part 180 may be configured to supply power input from an external power source to the respective elements of the refrigerator through a power cord (not shown) by the control of the processor 120.

The driving part 190 may include a compressor 191, a fan motor 192, a filter 193, or a heater 194 configured to operate according to the control of the processor 120. The driving part 190 may further include lighting (not shown) or a deodorizer (not shown).

The compressor 191 may be configured to compress a refrigerant which is a working fluid of a refrigerating cycle by the control of the processor 120. The refrigerating cycle may include a condenser (not shown) configured to convert a refrigerant in a gas state which is compressed by the compressor 191 to a refrigerant of a liquid state, an expander (not shown) configured to depressurize the refrigerant in the liquid state, and an evaporator (not shown) configured to vaporize the depressurized refrigerant in the liquid state. The processor 120 may be configured to control a temperature of a storage chamber through vaporization of the refrigerant in the liquid state. In addition, the refrigerator may be configured to control the temperature of the storage chamber through a peltier element (not shown) which uses a peltier effect, and a magnetic cooling device (not shown) which uses a magnetocaloric effect.

The fan motor 192 may be configured to rotate a fan which circulates outside air by the control of the processor 120. The air heated by the refrigerating cycle may be cooled by heat exchange through the outside air.

The filter 193 may sterilize (or, remove) bacteria which is floated or attached in the storage chamber by the control of the processor 120. The filter 193 may include an ion sterilization purifying part The heater 194 may be configured to remove the generated frost by the control of the processor 120. The heater 194 may include a defrosting heater. Here, the heater 194 may be used in executing the defrosting function.

Figure 4:
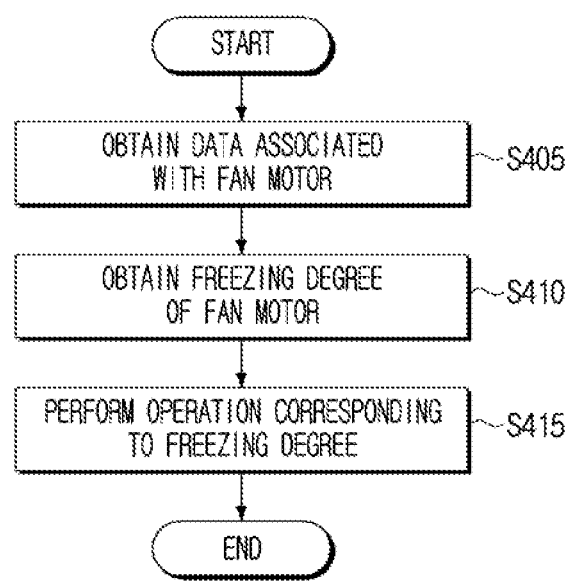
FIG. 4 is a flowchart illustrating a process of performing an operation corresponding to a freezing degree according to an embodiment.

FIG. 4 is a flowchart illustrating a process of performing an operation corresponding to a freezing degree.

Referring to FIG. 4, the electronic apparatus 100 may obtain data associated with the fan motor (S405). Here, the electronic apparatus 100 may measure the data associated with the fan motor in real-time. Then, the electronic apparatus 100 may obtain the freezing degree of the fan motor based on the data associated with the fan motor (S410). Then, the electronic apparatus 100 may perform the operation corresponding to the freezing degree (S415). Here, the operation corresponding to the freezing degree may mean an operation for providing notification information or an operation for executing the defrosting function.

Figure 5:
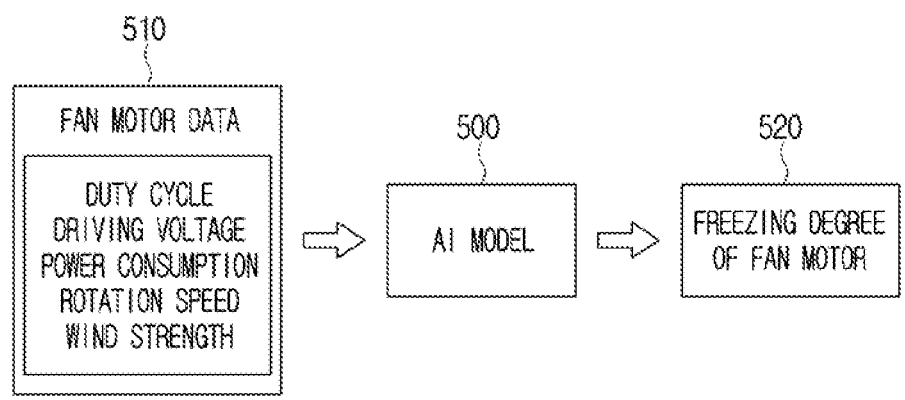
FIG. 5 is a diagram illustrating an operation for obtaining a freezing degree by using an artificial intelligence model according to an embodiment.

FIG. 5 is a diagram illustrating an operation for obtaining the freezing degree by using an artificial intelligence model.

Referring to FIG. 5, the electronic apparatus 100 may obtain the freezing degree of the fan motor 520 by using an artificial intelligence (AI) model 500. Specifically, the electronic apparatus 100 may obtain the freezing degree of the fan motor 520 as output data by inputting fan motor data 510 to the artificial intelligence model 500 as input data. Here, the fan motor data may include at least one from among the duty cycle, the driving voltage, the power consumption, the rotation speed, or the wind strength of the fan motor.

The electronic apparatus 100 may determine the current freezing degree of the fan motor based on fan motor data which is measured in real-time. Specifically, the electronic apparatus 100 may obtain the freezing degree of the fan motor by using the already trained artificial intelligence model 500. Specifically, the artificial intelligence model 500 may be configured to obtain the freezing degree of the fan motor based on how similar or how not similar the fan motor data which is measured in real-time is with a normal fan motor data. The more same the measured fan motor data is with the normal fan motor data, the freezing degree of the fan motor may be lower. In addition, the more different the measured fan motor data is from the normal fan motor data, the freezing degree of the fan motor may be higher.

The artificial intelligence model 500 may be a model which already completed learning, and the electronic apparatus 100 may obtain the freezing degree of the fan motor as output data by inputting input data to the artificial intelligence model 500 which already completed learning.

Figure 6:
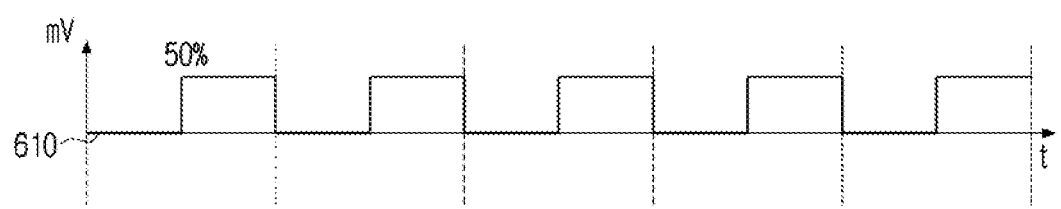
FIG. 6 are graphs illustrating an operation for determining a freezing degree of a fan motor by comparing duty cycles according to an embodiment.
Figure 6:
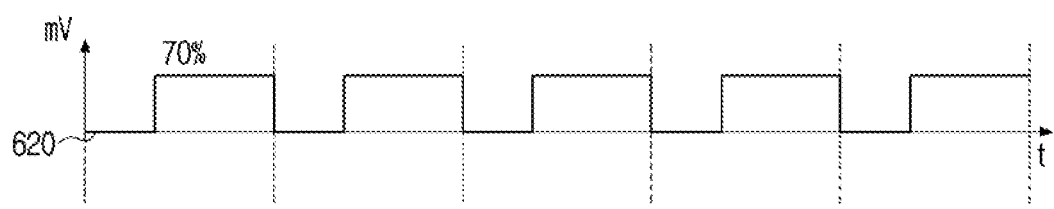

FIG. 6 are graphs illustrating an operation for determining a freezing degree of a fan motor by comparing duty cycles.

Referring to FIG. 6, graph 610 may show a normal duty cycle of the fan motor, and graph 620 may show an abnormal duty cycle of the fan motor. Here, the abnormal duty cycle of the fan motor may mean the duty cycle of the fan motor at which freezing has occurred.

In general, based on the fan motor being abnormal due to freezing, the duty cycle of the fan motor may increase. For example, the duty cycle of the fan motor on which freezing has occurred may be greater than or equal to 60%. Accordingly, the electronic apparatus 100 may identify, based on the duty cycle of the fan motor being greater than or equal to 60%, as freezing having occurred at the fan motor. If the duty cycle of the fan motor is greater than or equal to 60%, it may mean that the rotation speed of the fan motor is slow. Typically, when the duty cycle is between 0% and 50%, the rotation speed of the fan motor may become faster the higher the duty cycle. However, when the duty cycle is greater than or equal to 50%, the rotation speed of the fan motor may become slower the higher the duty cycle. Accordingly, the electronic apparatus 100 may determine, based on the measured duty cycle of the fan motor being greater than or equal to 60%, that the rotation speed of the fan motor has become abnormally slow due to freezing.

For example, based on the duty cycle being 50% as in graph 610, the electronic apparatus 100 may identify the fan motor as normal. In addition, based on the duty cycle being 70% as in graph 620, the electronic apparatus 100 may identify the fan motor as abnormal (freezing occurring at the fan motor).

Figure 7:
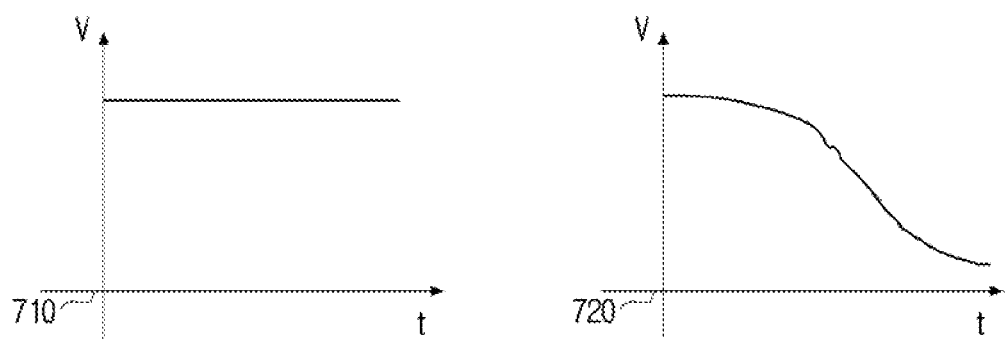
FIG. 7 are graphs illustrating an operation for determining a freezing degree of a fan motor by comparing driving voltages according to an embodiment.

FIG. 7 are graphs illustrating an operation for determining a freezing degree of a fan motor by comparing driving voltages.

Referring to FIG. 7, graph 710 may show a normal driving voltage of the fan motor, and graph 720 may show an abnormal driving voltage of the fan motor. Here, the abnormal driving voltage of the fan motor may mean the driving voltage of the fan motor at which freezing has occurred.

When freezing occurs at the fan motor, the rotation of the fan motor may be slowed or stopped. Accordingly, based on freezing progressing, the driving voltage transferred to the fan motor may become smaller. Based on the driving voltage of the fan motor being identified as reducing over time, the electronic apparatus 100 may identify that freezing has occurred at the fan motor.

For example, based on the driving voltage being constant over time as in graph 710, the electronic apparatus 100 may identify the fan motor as normal. In addition, based on the driving voltage being reduced over time as in graph 720, the electronic apparatus 100 may identify the fan motor as abnormal (freezing occurring at the fan motor).

Figure 8:
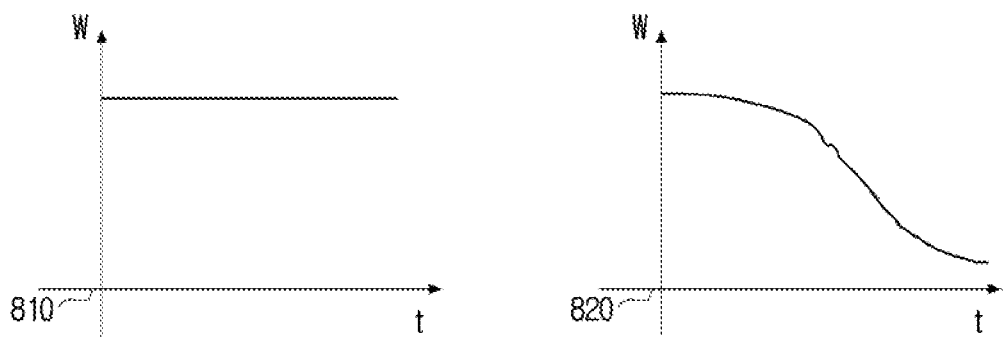
FIG. 8 are graphs illustrating an operation for determining a freezing degree of a fan motor by comparing power consumptions according to an embodiment.

FIG. 8 are graphs illustrating an operation for determining a freezing degree of a fan motor by comparing power consumptions.

Referring to FIG. 8, graph 810 may show a normal power consumption of the fan motor, and graph 820 may show an abnormal power consumption of the fan motor. Here, the abnormal power consumption of the fan motor may mean the power consumption of the fan motor at which freezing has occurred.

When freezing occurs at the fan motor, the rotation of the fan motor may be slowed or stopped. Accordingly, based on freezing progressing, the power consumption of the fan motor may be reduced. Based on the power consumption of the fan motor being identified as reducing over time, the electronic apparatus 100 may identify that freezing has occurred at the fan motor.

For example, based on the power consumption being constant over time as in graph 810, the electronic apparatus 100 may identify the fan motor as normal. In addition, based on the power consumption being reduced over time as in graph 820, the electronic apparatus 100 may identify the fan motor as abnormal (freezing occurring at the fan motor).

Figure 9:
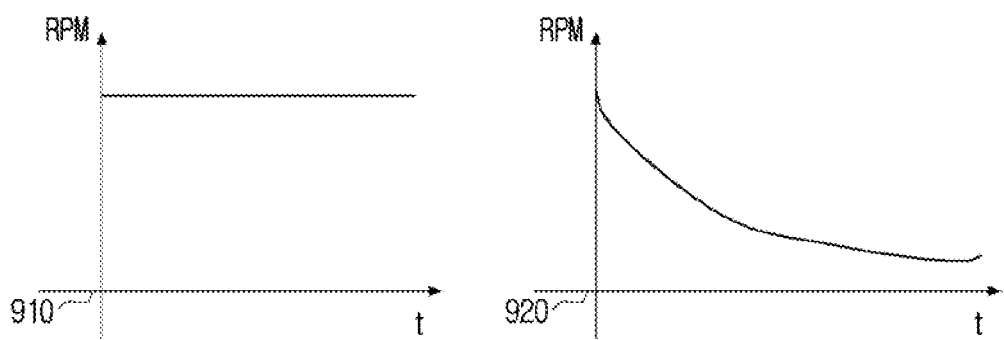
FIG. 9 are graphs illustrating an operation for determining a freezing degree of a fan motor by comparing speeds of rotation according to an embodiment.

FIG. 9 are graphs illustrating an operation for determining a freezing degree of a fan motor by comparing speeds of rotation.

Referring to FIG. 9, graph 910 may show a normal rotation speed of the fan motor, and graph 920 may show an abnormal rotation speed of the fan motor. Here, the abnormal rotation speed of the fan motor may mean the rotation speed of the fan motor at which freezing has occurred.

When freezing occurs at the fan motor, the rotation of the fan motor may be slowed or stopped. Accordingly, based on freezing progressing, the rotation speed of the fan motor may be reduced. Based on the rotation speed of the fan motor being identified as reducing over time, the electronic apparatus 100 may identify that freezing has occurred at the fan motor.

For example, based on the rotation speed being constant over time as in graph 910, the electronic apparatus 100 may identify the fan motor as normal. In addition, based on the rotation speed being reduced over time as in graph 920, the electronic apparatus 100 may identify the fan motor as abnormal (freezing occurring at the fan motor).

Figure 10:
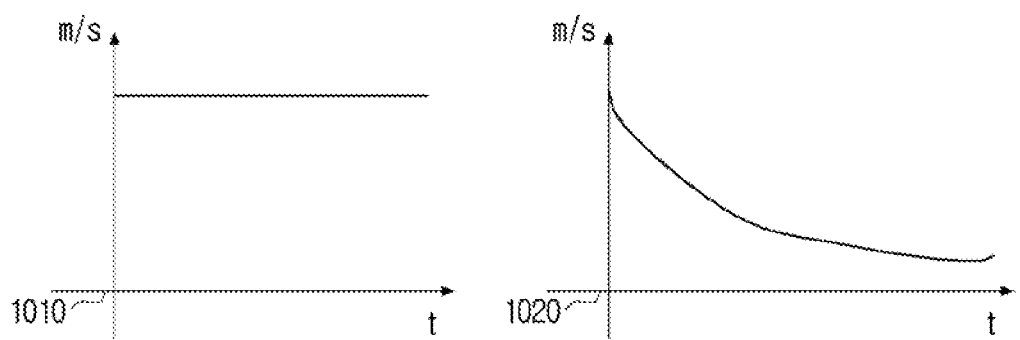
FIG. 10 are graphs illustrating an operation for determining a freezing degree of a fan motor by comparing wind strengths according to an embodiment.

FIG. 10 are graphs illustrating an operation for determining a freezing degree of a fan motor by comparing wind strengths.

Referring to FIG. 10, graph 1010 may show a normal wind strength of the fan motor, and graph 1020 may show an abnormal wind strength of the fan motor. Here, the abnormal wind strength of the fan motor may mean the wind strength of the fan motor at which freezing has occurred.

When freezing occurs at the fan motor, the rotation of the fan motor may be slowed or stopped. Accordingly, based on freezing progressing, the wind strength of the fan motor may be reduced. Based on the wind strength of the fan motor being identified as reducing over time, the electronic apparatus 100 may identify that freezing has occurred at the fan motor.

For example, based on the wind strength being constant over time as in graph 1010, the electronic apparatus 100 may identify the fan motor as normal. In addition, based on the wind strength being reduced over time as in graph 1020, the electronic apparatus may identify the fan motor as abnormal (freezing occurring at the fan motor).

Figure 11:
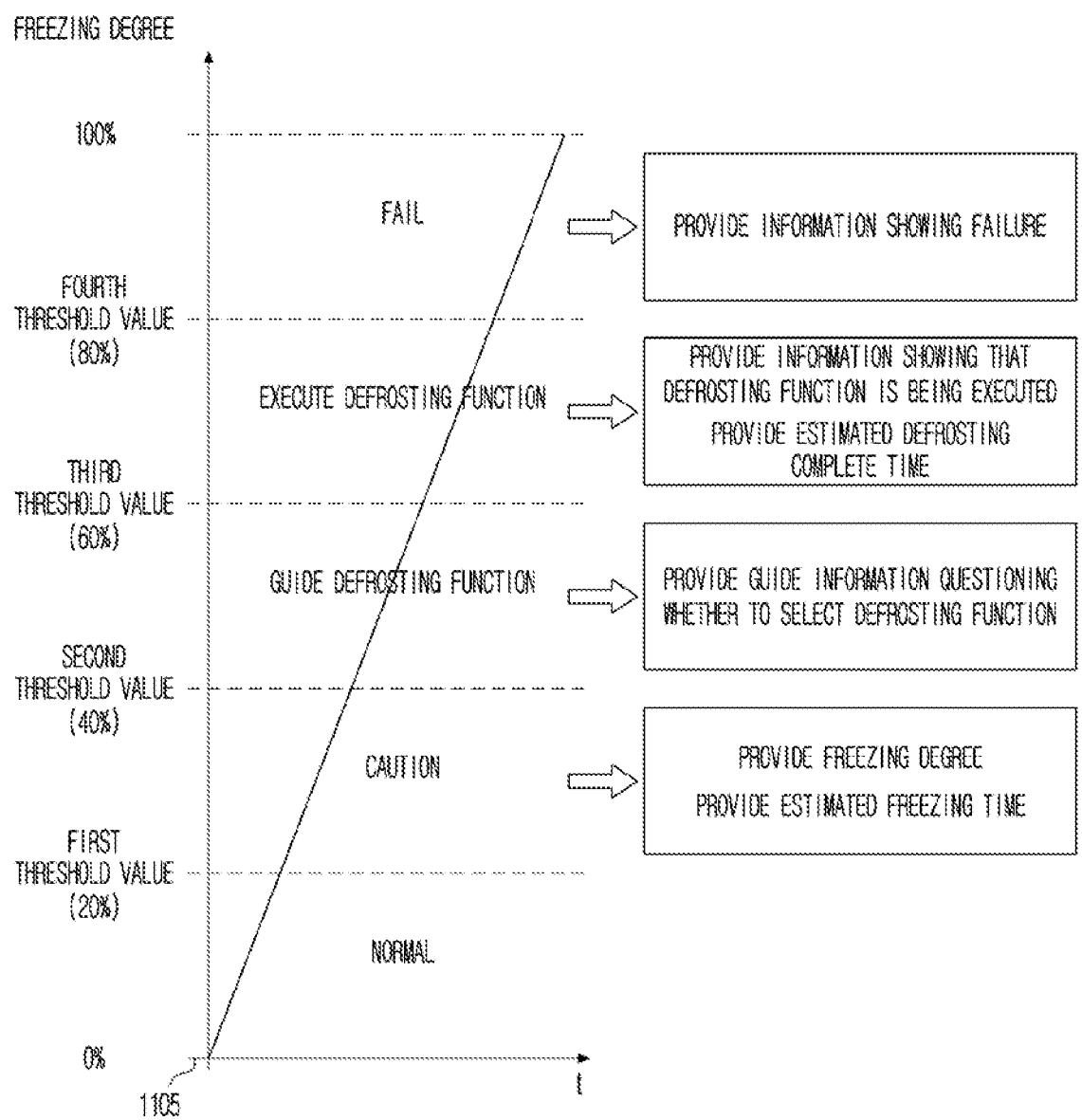
FIG. 11 is a diagram illustrating various operations being performed based on a freezing degree according to an embodiment.

FIG. 11 is a diagram illustrating various operations being performed based on a freezing degree.

Referring to FIG. 11, the electronic apparatus 100 may perform various corresponding operations according to the freezing degree of the fan motor. Graph 1105 shows an embodiment of the freezing degree increasing over time. Based on the freezing degree being between 0% and less than the first threshold value, the electronic apparatus 100 may identify the fan motor as normal.

Based on the freezing degree being greater than or equal to the first threshold value and less than the second threshold value, the electronic apparatus 100 may identify that there is a need to caution (or warn) although the fan motor is not frozen. Specifically, the electronic apparatus 100 may provide freezing information to caution freezing or warn freezing. Here, the freezing information may include at least one from among the freezing degree or the estimated freezing time. A user interface (UI) associated with the freezing degree will be described in FIG. 15.

Based on the freezing degree being greater than or equal to the second threshold value and less than the third threshold value, the electronic apparatus 100 may identify that a guide on the defrosting function is necessary. Specifically, the electronic apparatus 100 may provide guide information on the defrosting function. Here, the guide information on the defrosting function may include information questioning whether to select the defrosting function. The UI providing the guide information on the defrosting function will be described in FIG. 16.

Based on the freezing degree being greater than or equal to the third threshold value and less than the fourth threshold value, the electronic apparatus 100 may identify that there is a need to execute the defrosting function. Specifically, the electronic apparatus 100 may provide execution information on the defrosting function. Here the execution information on the defrosting function may include at least one from among information showing that the defrosting function is being executed, and an estimated defrosting complete time. The UI providing the execution information on the defrosting function will be described in FIG. 17.

Based on the freezing degree being greater than or equal to the fourth threshold value, the electronic apparatus 100 may identify the fan motor as having failed. Specifically, the electronic apparatus 100 may provide failure information. Here, the UI providing the failure information will be described in FIG. 18.

Figure 12:
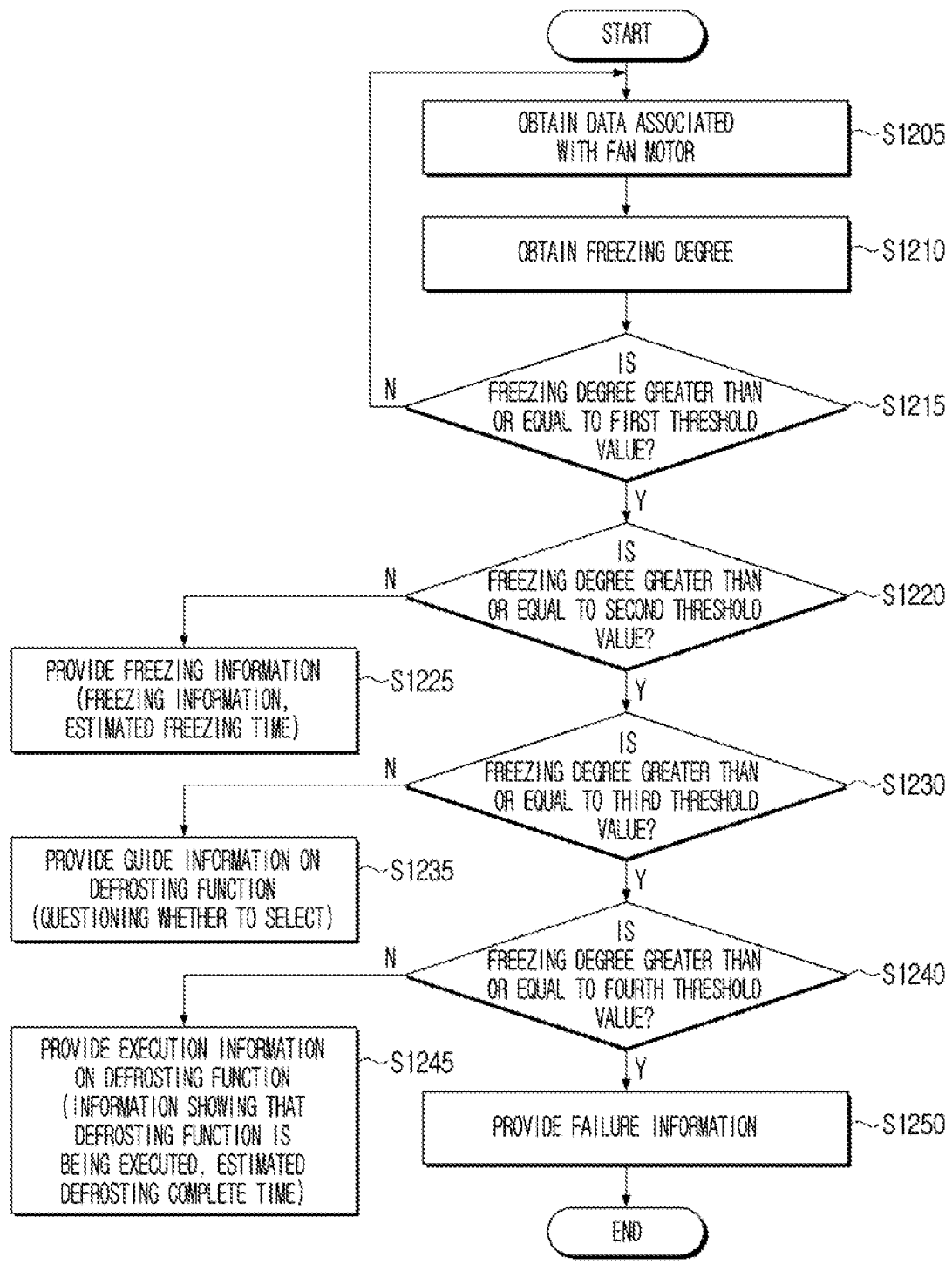
FIG. 12 is a flowchart illustrating various operations being performed based on a freezing degree according to an embodiment.

FIG. 12 is a flowchart illustrating various operations being performed based on a freezing degree.

Referring to FIG. 12, the electronic apparatus 100 may obtain data associated with the fan motor (S1205). Then, the electronic apparatus 100 may obtain the freezing degree based on the data associated with the fan motor (S1210). Here, the electronic apparatus 100 may identify whether the freezing degree is greater than or equal to the first threshold value (S1215).

Based on the freezing degree being less than the first threshold value (S1215—N), the electronic apparatus 100 may repeatedly obtain the data associated with the fan motor. Based on the freezing degree being greater than or equal to the first threshold value (S1215—Y), the electronic apparatus 100 may identify whether the freezing degree is greater than or equal to the second threshold value (S1220).

Based on the freezing degree being less than the second threshold value (S1220—N), the electronic apparatus 100 may provide freezing information (S1225). Based on the freezing degree being greater than or equal to the second threshold value (S1220—Y), the electronic apparatus 100 may identify whether the freezing degree is greater than or equal to the third threshold value (S1230).

Based on the freezing degree being less than the third threshold value (S1230—N), the electronic apparatus 100 may provide guide information on the defrosting function (S1235). Based on the freezing degree being greater than or equal to the third threshold value (S1230—Y), the electronic apparatus 100 may identify whether the freezing degree is greater than or equal to the fourth threshold value (S1240).

Based on the freezing degree being less than the fourth threshold value (S1240—N), the electronic apparatus 100 may provide execution information on the defrosting function (S1245). Based on the freezing degree being greater than or equal to the fourth threshold value (S1240—Y), the electronic apparatus 100 may provide failure information (S1250).

Figure 13:
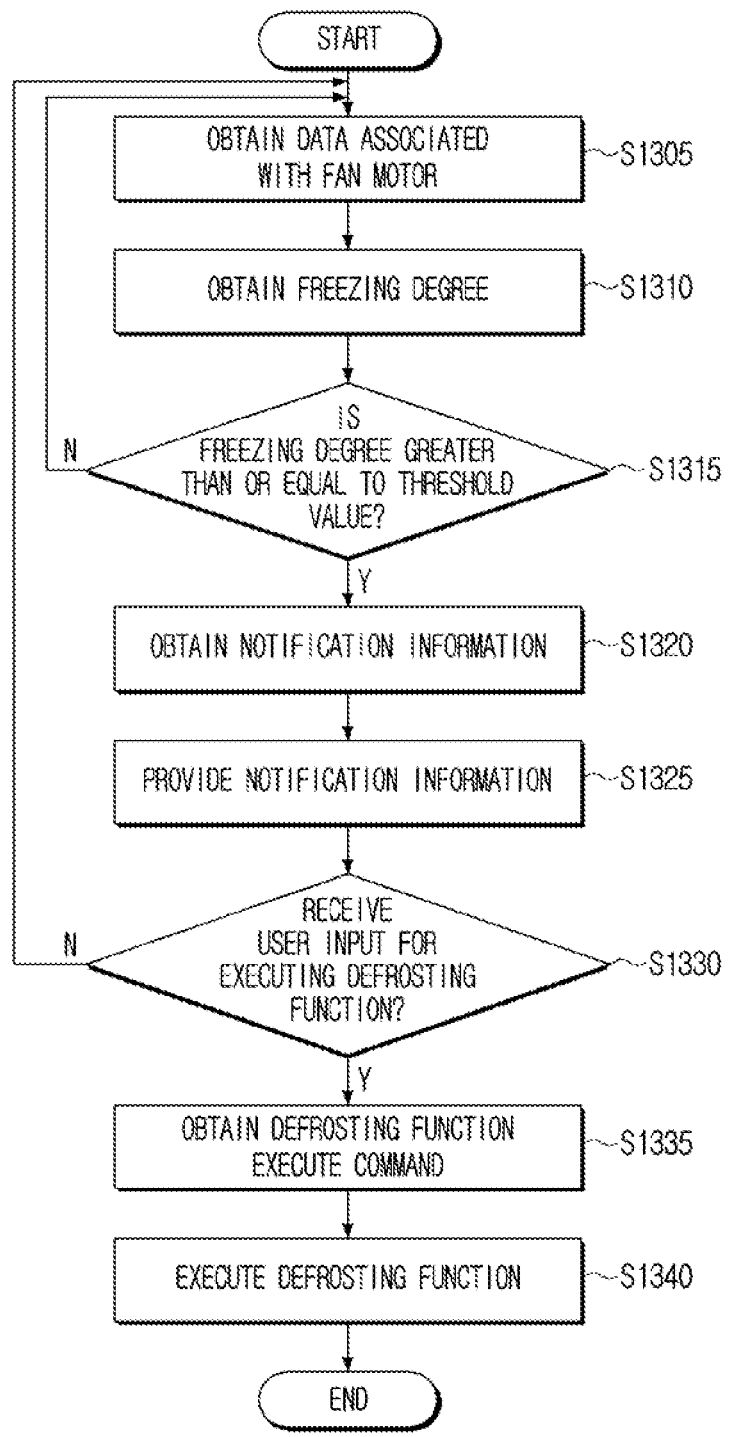
FIG. 13 is a flowchart illustrating an embodiment of a user input for executing a defrosting function being received in an electronic apparatus according to an embodiment.

FIG. 13 is a flowchart illustrating an embodiment of the user input for executing a defrosting function being received in the electronic apparatus 100.

Referring to FIG. 13, the electronic apparatus 100 may obtain data associated with the fan motor (S1305). Then, the electronic apparatus 100 may obtain the freezing degree of the fan motor based on the data associated with the fan motor (S1310). Then, the electronic apparatus 100 may identify whether the freezing degree is greater than or equal to the threshold value (S1315). Based on the freezing degree being less than the threshold value (S1315—N), the electronic apparatus 100 may repeatedly obtain the data associated with the fan motor in real-time.

Based on the freezing degree being greater than or equal to the threshold value (S1315—Y), the electronic apparatus 100 may obtain notification information corresponding to the data associated with the fan motor (S1320). Then, the electronic apparatus 100 may provide the notification information (S1325).

The electronic apparatus 100 may identify whether the user input for executing the defrosting function has been received (S1330). Based on the user input for executing the defrosting function not being received (S1330—N), the electronic apparatus 100 may repeatedly obtain data associated with the fan motor in real-time.

Based on the user input for executing the defrosting function being received (S1330—Y), the electronic apparatus 100 may obtain a defrosting function execute command (S1335). Here, the defrosting function execute command may mean a control command for executing the defrosting function. Then, the electronic apparatus 100 may execute the defrosting function (S1340).

Figure 14:
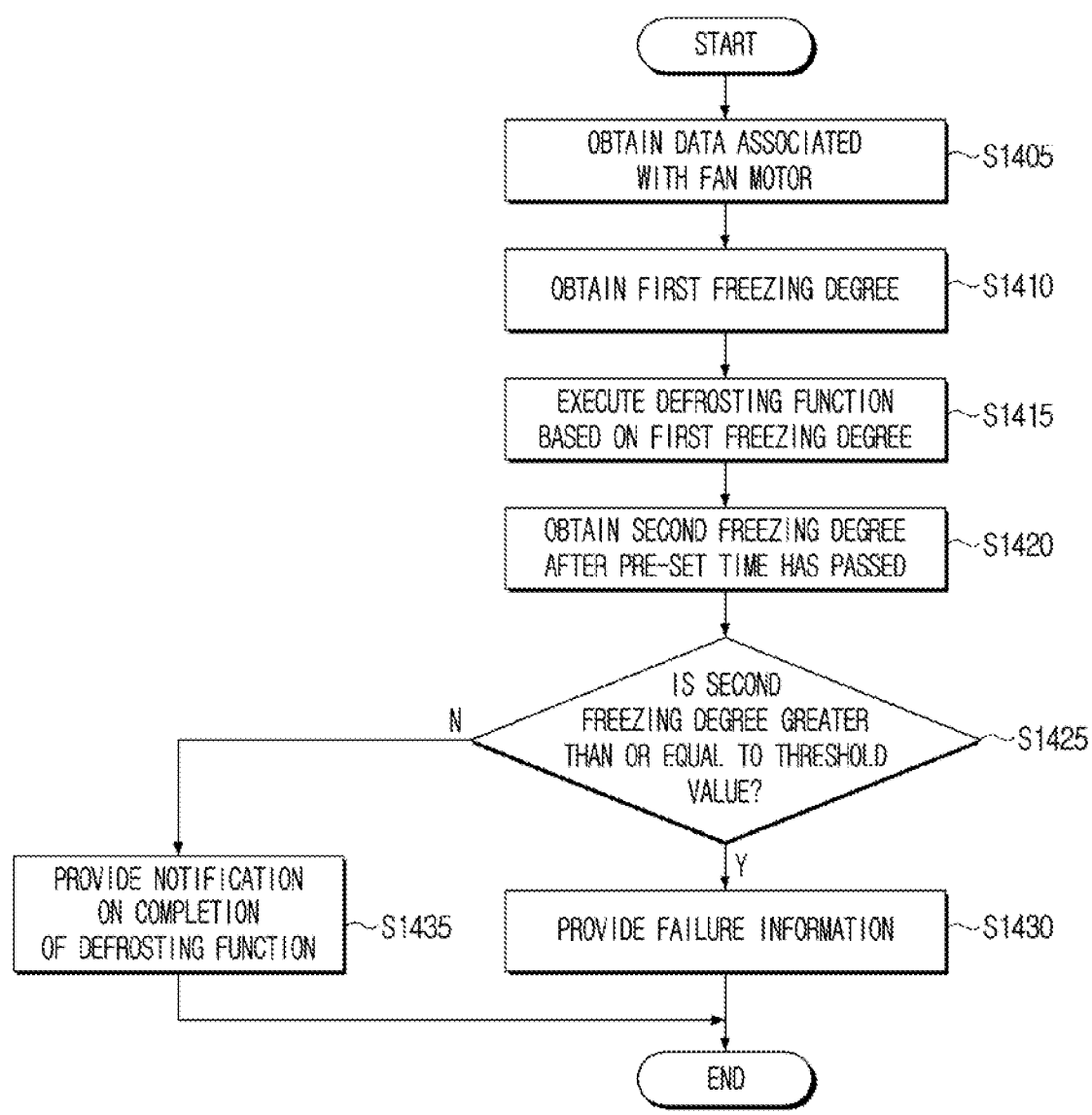
FIG. 14 is a flowchart illustrating an operation for determining a freezing degree once more after executing a defrosting function according to an embodiment.

FIG. 14 is a flowchart illustrating an operation for determining a freezing degree once more after executing a defrosting function.

Referring to FIG. 14, the electronic apparatus 100 may obtain data associated with the fan motor (S1405). Then, the electronic apparatus 100 may obtain a first freezing degree based on the data associated with the fan motor (S1410). Then, the electronic apparatus 100 may execute the defrosting function based on the first freezing degree (S1415).

Here, the electronic apparatus 100 may obtain a second freezing degree after a pre-set time has passed (S1420). Then, the electronic apparatus 100 may identify whether the second freezing degree is greater than or equal to the threshold value (S1425).

Based on the second freezing degree being greater than or equal to the threshold value (S1425—Y), the electronic apparatus 100 may provide failure information (S1430). In addition, based on the second freezing degree being less than the threshold value (S1425—N), the electronic apparatus 100 may provide a notification on the completion of the defrosting function (S1435).

Figure 15:
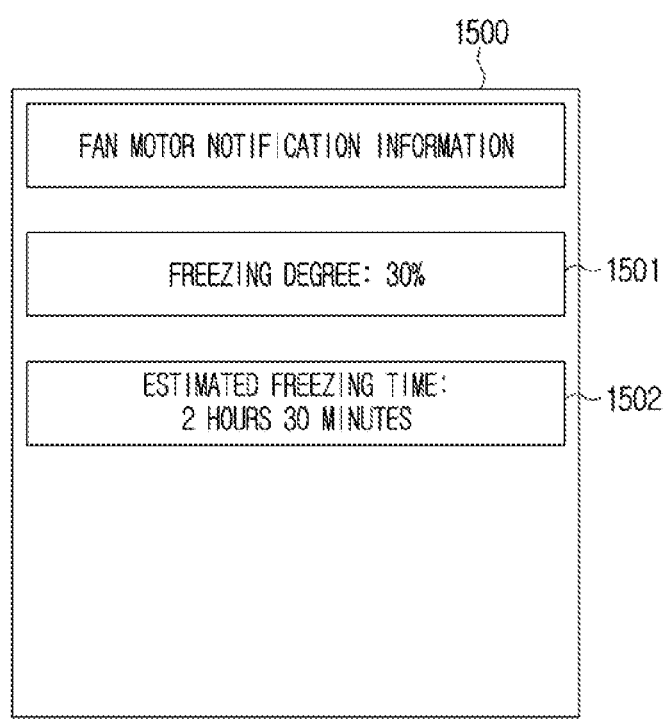
FIG. 15 is a diagram illustrating an operation for providing freezing information according to an embodiment.

FIG. 15 is a diagram illustrating an operation for providing freezing information.

Referring to FIG. 15, the electronic apparatus 100 may provide a screen 1500 including freezing information. Here, the screen 1500 may include at least one from among a UI showing a freezing degree 1501 or a UI showing an estimated freezing time 1502. The freezing degree may mean a percentage showing an extent of which the freezing of the fan motor is under progress. The electronic apparatus 100 may obtain the estimated freezing time based on the data associated with the fan motor. Then, the electronic apparatus 100 may provide the screen 1500 including the obtained estimated freezing time.

Figure 16:
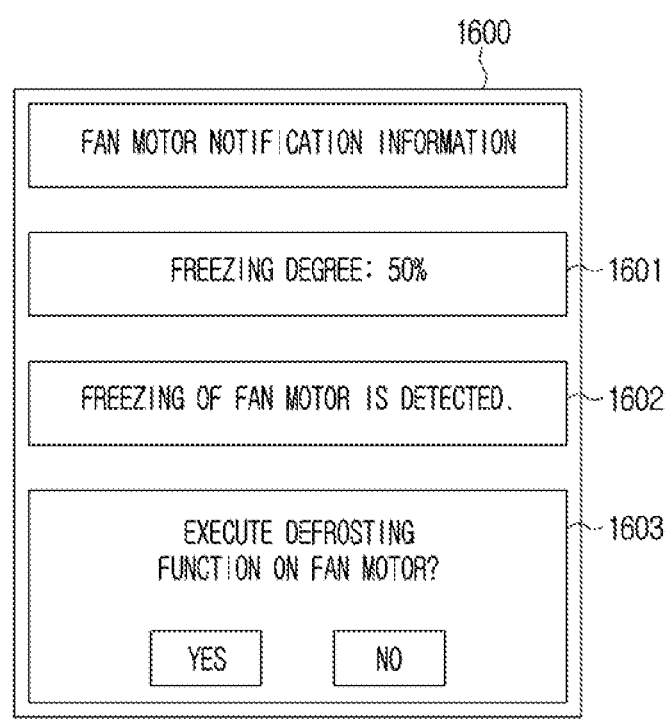
FIG. 16 is a diagram illustrating an operation for providing guide information on a defrosting function according to an embodiment.

FIG. 16 is a diagram illustrating an operation for providing guide information on a defrosting function.

Referring to FIG. 16, the electronic apparatus 100 may provide a screen 1600 including guide information on the defrosting function. Here, the screen 1600 may include at least one a UI showing the freezing degree 1601, a UI to notify that the freezing of the fan motor is detected 1602, or a UI to guide whether to execute the defrosting function 1603. Based on the user input being received through the UI 1603, the electronic apparatus 100 may perform an operation corresponding to the user input. For example, based on the user input for executing the defrosting function being received through the UI 1603, the electronic apparatus 100 may execute the defrosting function.

Figure 17:
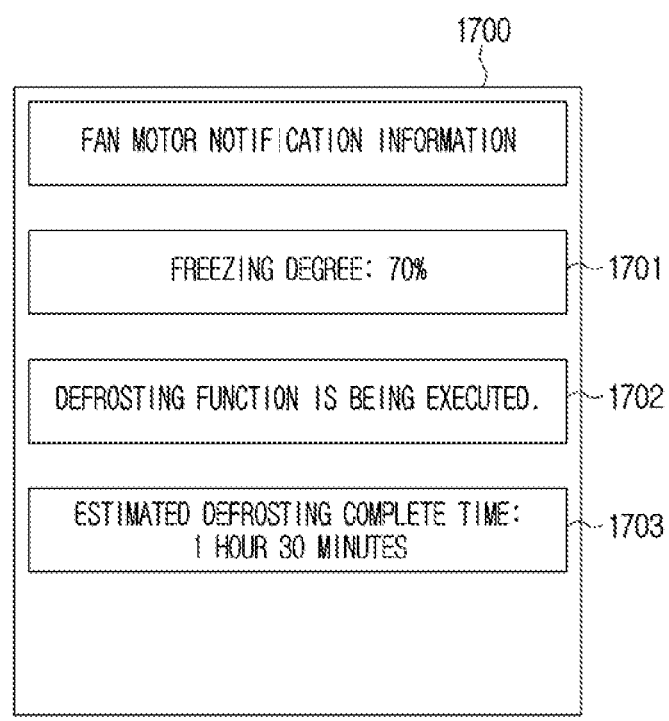
FIG. 17 is a diagram illustrating an operation for providing execution information on a defrosting function according to an embodiment.

FIG. 17 is a diagram illustrating an operation for providing execution information on a defrosting function.

Referring to FIG. 17, the electronic apparatus 100 may provide a screen 1700 including execution information on the defrosting function. Here, the screen 1700 may include at least one from among a UI showing the freezing degree 1701, a UI to notify that the defrosting function is being executed 1702, and a UI showing the estimated defrosting complete time 1703. The electronic apparatus 100 may obtain the estimated defrosting complete time based on the data associated with the fan motor and the data associated with the defrosting function. Then, the electronic apparatus 100 may provide the screen 1700 including the obtained estimated defrosting complete time.

Figure 18:
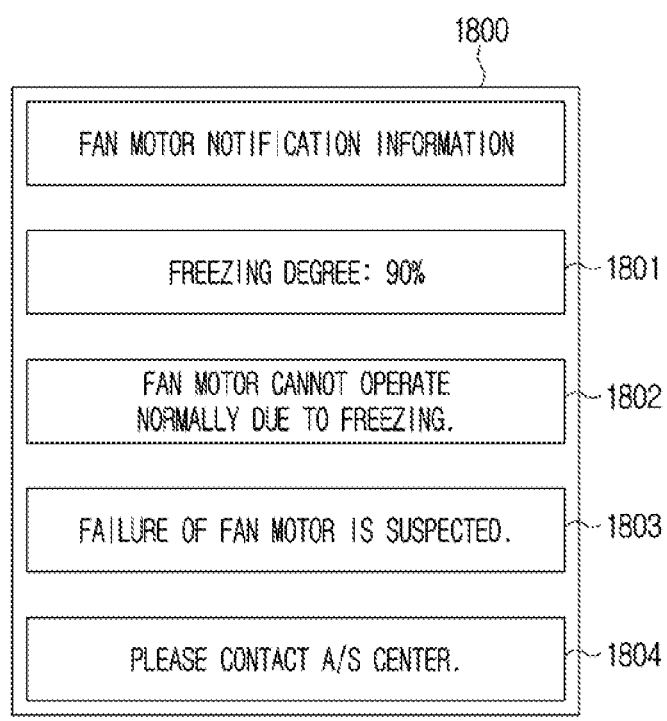
FIG. 18 is a diagram illustrating an operation for providing failure information according to an embodiment.

FIG. 18 is a diagram illustrating an operation for providing failure information.

Referring to FIG. 18, the electronic apparatus 100 may provide a screen 1800 including failure information. Here, the screen 1800 may include at least one from among a UI showing the freezing degree 1801, a UI showing a state of the fan motor 1802, a UI to notify a failure of the fan motor 1803, and a UI to provide an alternative method on a failure reason 1804.

Figure 19:
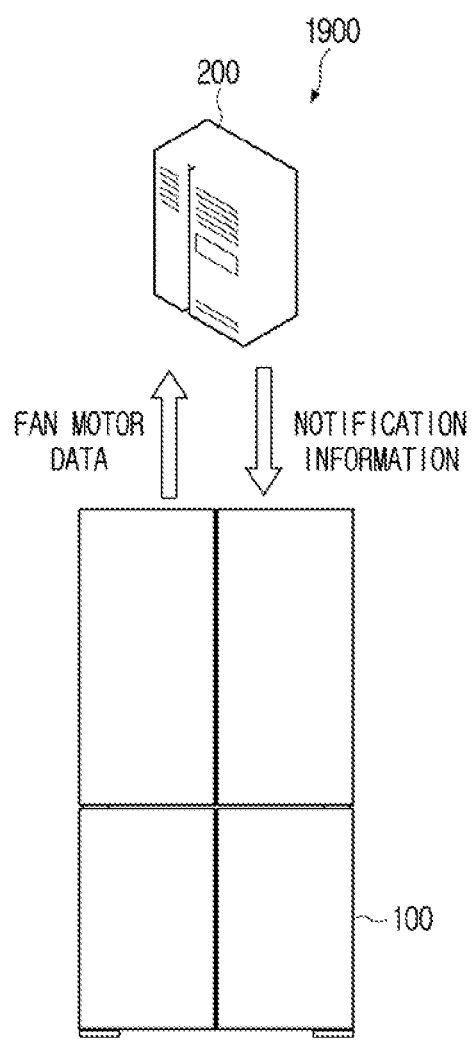
FIG. 19 is a system diagram illustrating an embodiment for obtaining a freezing degree by using an external server according to an embodiment.

FIG. 19 is a system diagram illustrating an embodiment for obtaining a freezing degree by using the external server 200.

Referring to FIG. 19, a system 1900 may include the electronic apparatus 100 and the external server 200. Here, the external server 200 may store an artificial intelligence model. Accordingly, the external server 200 may obtain the freezing degree of the fan motor as output data when the input data is received.

The electronic apparatus 100 may transmit the obtained fan motor data to the external server 200. The external server 200 may input the fan motor data received from the electronic apparatus 100 to the artificial intelligence model, and obtain the freezing degree of the fan motor from the artificial intelligence model. Then, the external server 200 may obtain the notification information corresponding to the freezing degree of the fan motor by using the artificial intelligence model. Then, the external server 200 may transmit the obtained notification information to the electronic apparatus 100.

Figure 20:
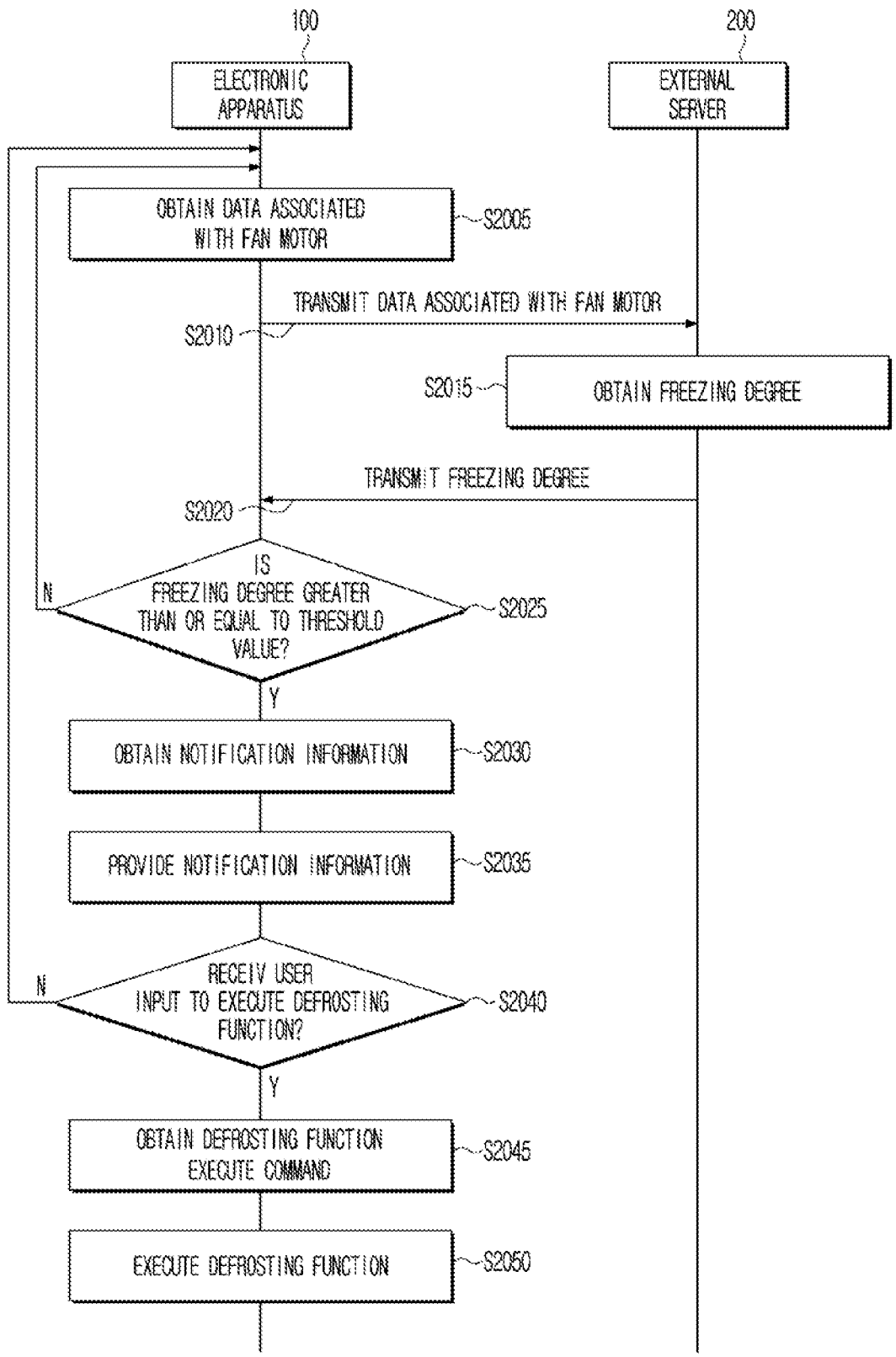
FIG. 20 is a flowchart illustrating an embodiment for obtaining a freezing degree by using an external server according to an embodiment.

FIG. 20 is a flowchart illustrating an embodiment for obtaining a freezing degree by using the external server 200 according to an embodiment.

Referring to FIG. 20, the electronic apparatus 100 may obtain data associated with the fan motor (S2005). Then, the electronic apparatus 100 may transmit the data associated with the fan motor to the external server 200 (S2010).

The external server 200 may obtain the freezing degree of the fan motor based on the data associated with the fan motor received from the electronic apparatus 100 (S2015). Then, the external server 200 may transmit the obtained freezing degree of the fan motor to the electronic apparatus 100 (S2020).

The electronic apparatus 100 may identify whether the freezing degree of the fan motor received from the external server 200 is greater than or equal to the threshold value (S2025). Based on the freezing degree of the fan motor being less than the threshold value (S2025—N), the electronic apparatus 100 may repeatedly obtain the data associated with the fan motor.

Based on the freezing degree of the fan motor being greater than or equal to the threshold value (S2025—Y), the electronic apparatus 100 may obtain the notification information corresponding to the freezing degree of the fan motor (S2030). Then, the electronic apparatus 100 may provide the notification information (S2035).

The electronic apparatus 100 may identify whether a user input for executing the defrosting function is received (S2040). Based on the user input for executing the defrosting function not being received (S2040—N), the electronic apparatus 100 may repeatedly obtain the data associated with the fan motor.

Based on the user input for executing the defrosting function being received (S2040—Y), the electronic apparatus 100 may obtain the defrosting function execute command (S2045). Then, the electronic apparatus 100 may execute the defrosting function based on the obtained defrosting function execute command (S2050).

Figure 21:
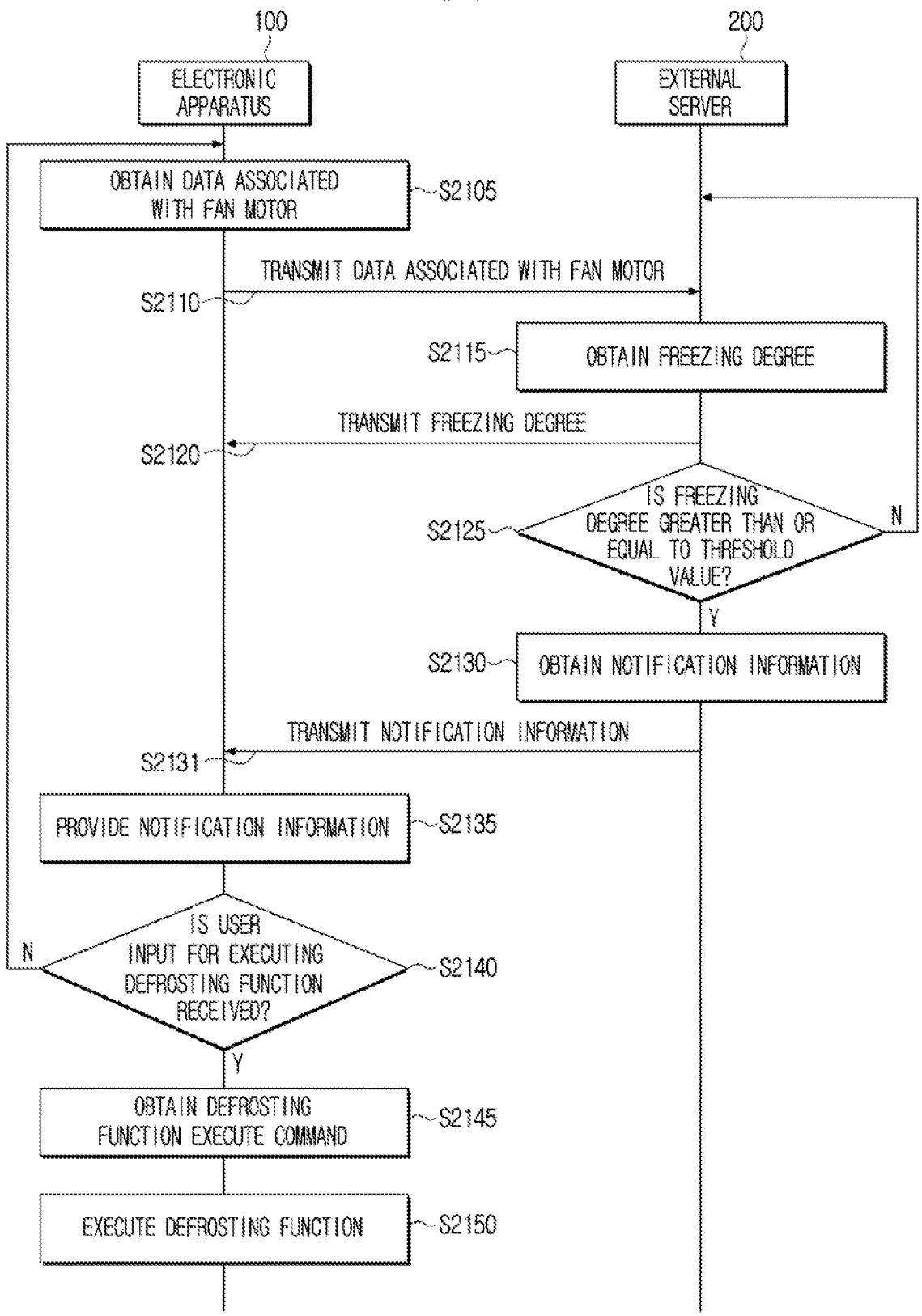
FIG. 21 is a flowchart illustrating an embodiment for obtaining notification information by using an external server according to another embodiment.

FIG. 21 is a flowchart illustrating an embodiment for obtaining notification information by using the external server 200 according to another embodiment.

Referring to FIG. 21, the steps S2105, S2110, S2115, S2120, S2135, S2140, S2145, and S2150 correspond to steps S2005, S2010, S2015, S2020, S2035, S2040, S2045, and S2050 in FIG. 20. Accordingly, redundant descriptions thereof will be omitted.

Unlike FIG. 20, in the embodiment of FIG. 21, an operation of obtaining the notification information based on the freezing degree may be performed in the external server 200. Specifically, the external server 200 may identify whether the obtained freezing degree of the fan motor is greater than or equal to the threshold value (S2125).

Based on the freezing degree of the fan motor being less than the threshold value (S2125—N), the electronic apparatus 100 may repeatedly obtain the freezing degree based on the data associated with the fan motor received from the electronic apparatus 100.

Based on the freezing degree of the fan motor being greater than or equal to the threshold value (S2125—Y), the electronic apparatus 100 may obtain notification information corresponding to the freezing degree of the fan motor (S2130). Then, the external server 200 may transmit the obtained notification information to the electronic apparatus 100 (S2131).

Figure 22:
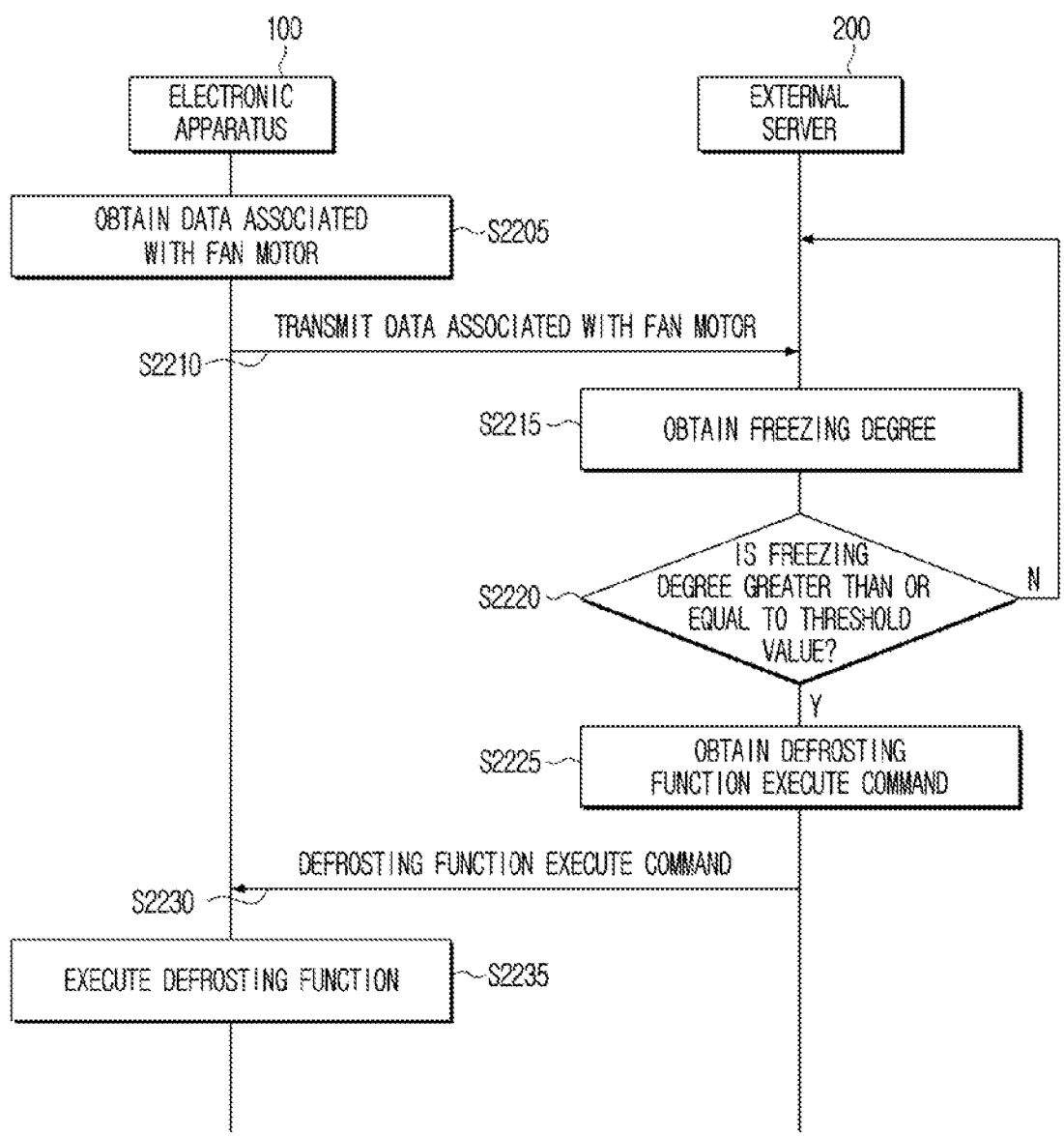
FIG. 22 is a flowchart illustrating an embodiment for obtaining a defrosting function execute command by using an external server according to still another embodiment.

FIG. 22 is a flowchart illustrating an embodiment for obtaining a defrosting function execute command by using the external server 200 according to still another embodiment.

Referring to FIG. 22, the electronic apparatus 100 may obtain data associated with the fan motor (S2205). Here, the electronic apparatus 100 may transmit the data associated with the fan motor to the external server 200 (S2210).

The external server 200 may obtain the freezing degree of the fan motor based on the data associated with the fan motor received from the electronic apparatus 100 (S2215). In addition, the external server 200 may identify whether the freezing degree of the fan motor is greater than or equal to the threshold value (S2220).

Based on the freezing degree of the fan motor being less than the threshold value (S2220—N), the external server 200 may repeatedly obtain the freezing degree of the fan motor based on the data associated with the fan motor received from the electronic apparatus 100.

Based on the freezing degree of the fan motor being greater than or equal to the threshold value (S2220—Y), the external server 200 may obtain the defrosting function execute command (S2225). Then, the external server 200 may transmit the defrosting function execute command to the electronic apparatus 100 (S2230).

Based on the defrosting function execute command received from the external server 200 being received, the electronic apparatus 100 may execute the defrosting function (S2235).

Figure 23:
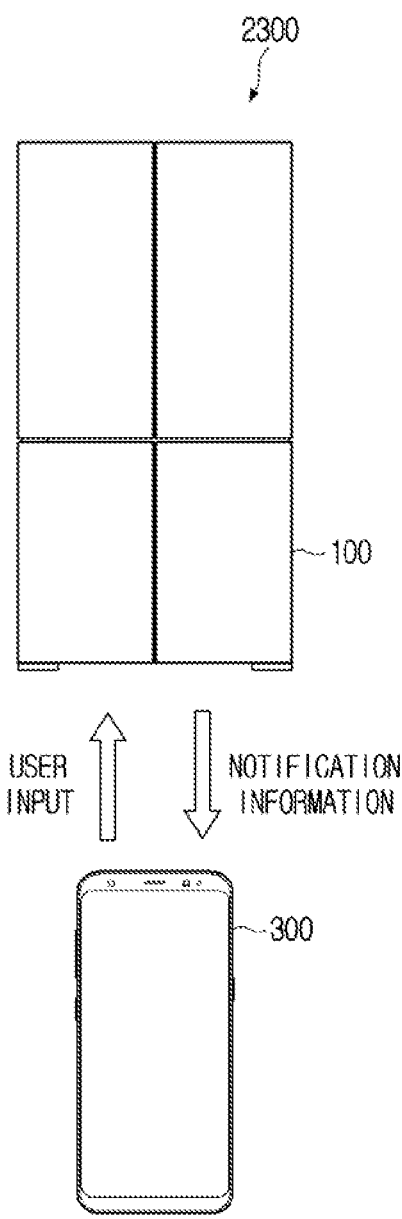
FIG. 23 is a system diagram illustrating an embodiment for providing notification information by using a terminal device according to an embodiment.

FIG. 23 is a system diagram illustrating an embodiment for providing notification information by using the terminal device 300.

Referring to FIG. 23, a system 2300 may include the electronic apparatus 100 and the terminal device 300. Here, the terminal device 300 may be a user terminal device, and may mean a smartphone, a tablet, a wearable device, a personal computer, or the like.

The electronic apparatus 100 may transmit notification information to the terminal device 300. Here, the terminal device 300 may provide the notification information received from the electronic apparatus 100. The terminal device 300 may transmit, based on the user input being received, the received user input to the electronic apparatus 100.

Figure 24:
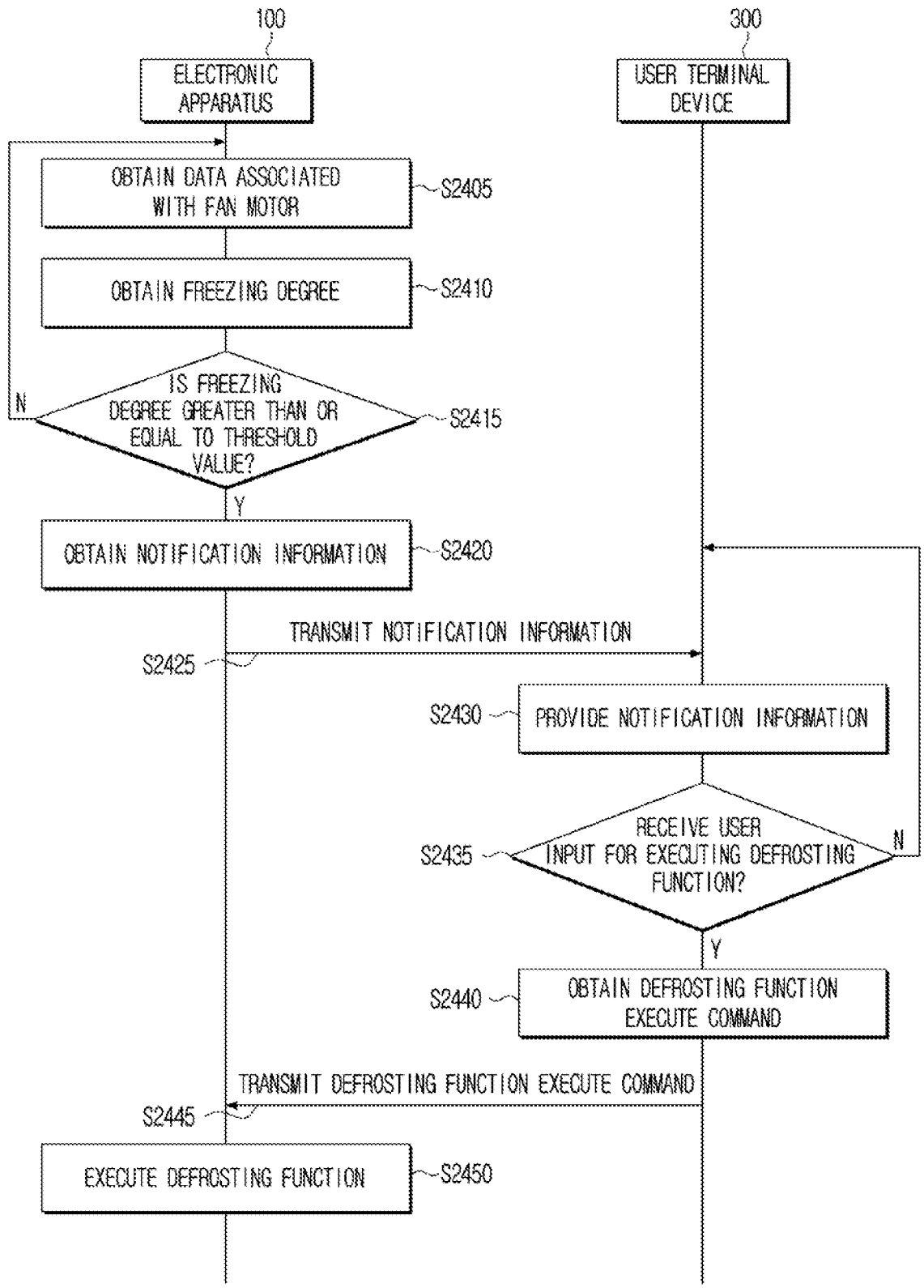
FIG. 24 is a flowchart illustrating an embodiment for providing notification information by using a terminal device according to an embodiment.

FIG. 24 is a flowchart illustrating an embodiment for providing notification information by using the terminal device 300.

Referring to FIG. 24, steps S2405, S2410, S2415, and S2420 may correspond to steps S1305, S1310, S1315, S1320 in FIG. 13. Accordingly, redundant descriptions will be omitted.

Unlike FIG. 13, in the embodiment of FIG. 24, an operation of providing notification information and an operation of receiving the user input may be performed in the terminal device 300.

Specifically, the electronic apparatus 100 may transmit the notification information to the terminal device 300 (S2425). Here, the terminal device 300 may provide the notification information received from the electronic apparatus 100 (S2430). Then, the terminal device 300 may identify whether the user input for executing the defrosting function is received (S2435). Based on the user input for executing the defrosting function not being received (S2435—N), the terminal device 300 may repeatedly receive the notification information from the electronic apparatus 100 and provide the received information.

Based on the user input for executing the defrosting function being received (S2435—Y), the terminal device 300 may obtain the defrosting function execute command (S2440). Then, the terminal device 300 may transmit the defrosting function execute command to the electronic apparatus 100 (S2445). Then, the electronic apparatus 100 may execute the defrosting function based on the defrosting function execute command received from the external server 200 (S2450).

Figure 25:
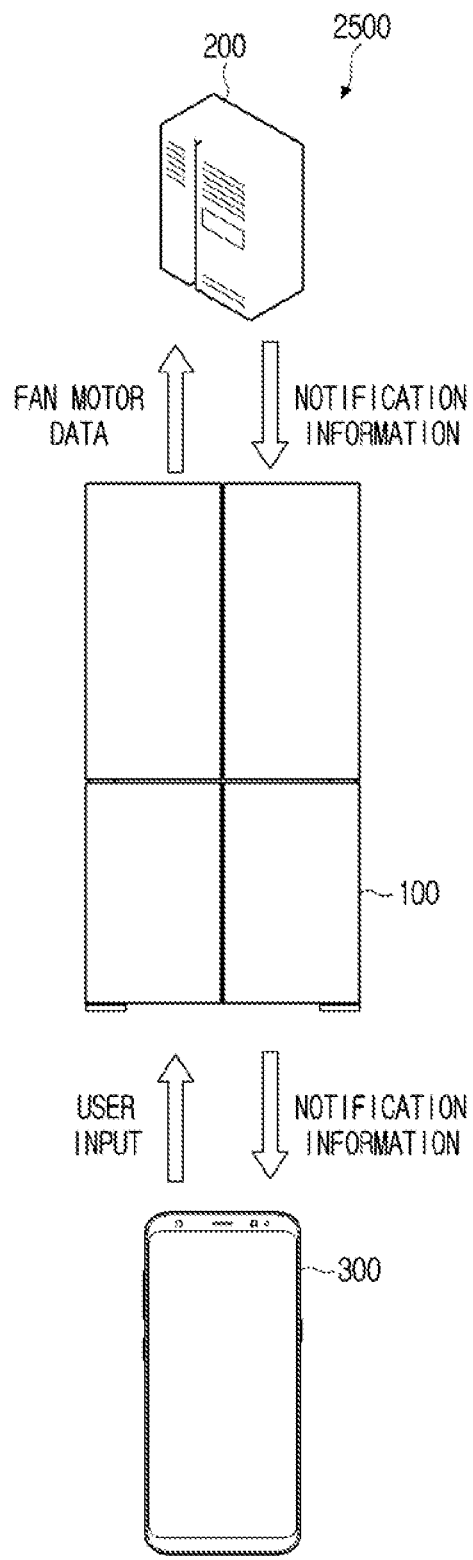
FIG. 25 is a system diagram illustrating an embodiment for providing notification information to a terminal device communicating with an electronic apparatus according to an embodiment.

FIG. 25 is a system diagram illustrating an embodiment for providing notification information to the terminal device 300 communicating with the electronic apparatus 100 according to an embodiment.

Referring to FIG. 25, a system 2500 may include the electronic apparatus 100, the external server 200, and the terminal device 300. Here, the electronic apparatus 100 may obtain fan motor data. Then, the electronic apparatus 100 may transmit the fan motor data to the external server 200.

The external server 200 may obtain the freezing degree of the fan motor based on the fan motor data received from the electronic apparatus 100. Then, the external server 200 may obtain notification information corresponding to the freezing degree of the fan motor. Then, the external server 200 may transmit the notification information to the electronic apparatus 100.

The electronic apparatus 100 may transmit the notification information received from the external server 200 to the terminal device 300.

The terminal device 300 may provide the notification information received from the electronic apparatus 100. Then, based on receiving the user input associated with the notification information, the terminal device 300 may transmit the user input to the electronic apparatus 100.

Based on the user input being received from the terminal device 300, the electronic apparatus 100 may perform an operation corresponding to the user input.

Figure 26:
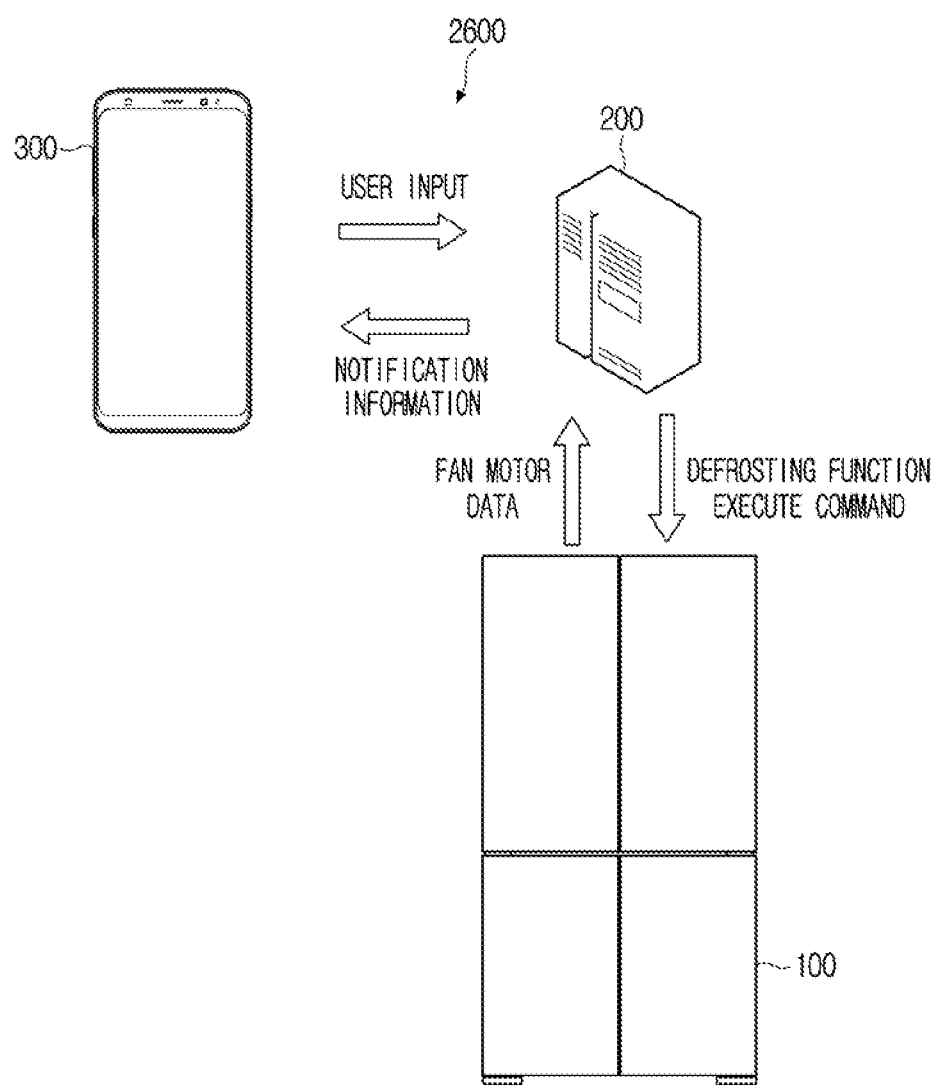
FIG. 26 is a system diagram illustrating an embodiment for providing notification information to a terminal device communicating with an external server according to another embodiment.

FIG. 26 is a system diagram illustrating an embodiment for providing notification information to the terminal device 300 communicating with the external server 200 according to another embodiment.

Referring to FIG. 26, a system 2600 may include the electronic apparatus 100, the external server 200, and the terminal device 300. Here, the electronic apparatus 100 may obtain fan motor data. Then, the electronic apparatus 100 may transmit the fan motor data to the external server 200.

The external server 200 may obtain the freezing degree of the fan motor based on the fan motor data received from the electronic apparatus 100. Then, the external server 200 may obtain notification information corresponding to the freezing degree of the fan motor. Then, the external server 200 may transmit the notification information to the terminal device 300

The terminal device 300 may provide the notification information received from the external server 200. Then, based on receiving the user input associated with the notification information, the terminal device 300 may transmit the user input to the external server 200.

Based on the user input being received from the terminal device 300 and the received user input being a control command for executing the defrosting function, the external server 200 may obtain the defrosting function execute command. Then, the external server 200 may transmit the defrosting function execute command to the electronic apparatus 100

Based on the defrosting function execute command being received from the external server 200, the electronic apparatus 100 may execute the defrosting function.

Figure 27:
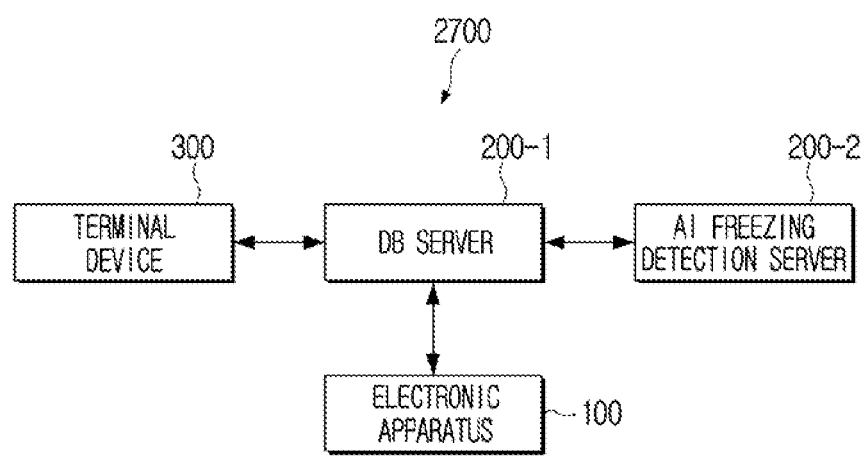
FIG. 27 is a system diagram illustrating an operation of an external server according to an embodiment.

FIG. 27 is a system diagram illustrating an operation of the external server 200 according to an embodiment.

Referring to FIG. 27, a system 2700 may include the electronic apparatus 100, a database (DB) server 200-1, an artificial intelligence (AI) freezing detection server 200-2, and the terminal device 300.

The DB server 200-1 may mean a server configured to store fan motor data.

In addition, the artificial intelligence freezing detection server 200-2 may mean a server configured to output the freezing degree based on the collected fan motor data. Here, the artificial intelligence model may be stored in the artificial intelligence freezing detection server 200-2.

Specifically, the electronic apparatus 100 may obtain fan motor data, and transmit the obtained fan motor data to the DB server 200-1. Then, the DB server 200-1 may store the received fan motor data and transmit the stored fan motor data to the artificial intelligence freezing detection server 200-2.

The artificial intelligence freezing detection server 200-2 may obtain the freezing degree based on the fan motor data received from the DB server 200-1. Then, the artificial intelligence freezing detection server 200-2 may obtain notification information corresponding to the freezing degree. Then, the artificial intelligence freezing detection server 200-2 may transmit the notification information to the DB server 200-1.

The DB server 200-1 may store the notification information received from the artificial intelligence freezing detection server 200-2. Then, the DB server 200-1 may transmit the notification information to the terminal device 300.

The terminal device 300 may provide the notification information received from the DB server 200-1.

Figure 28:
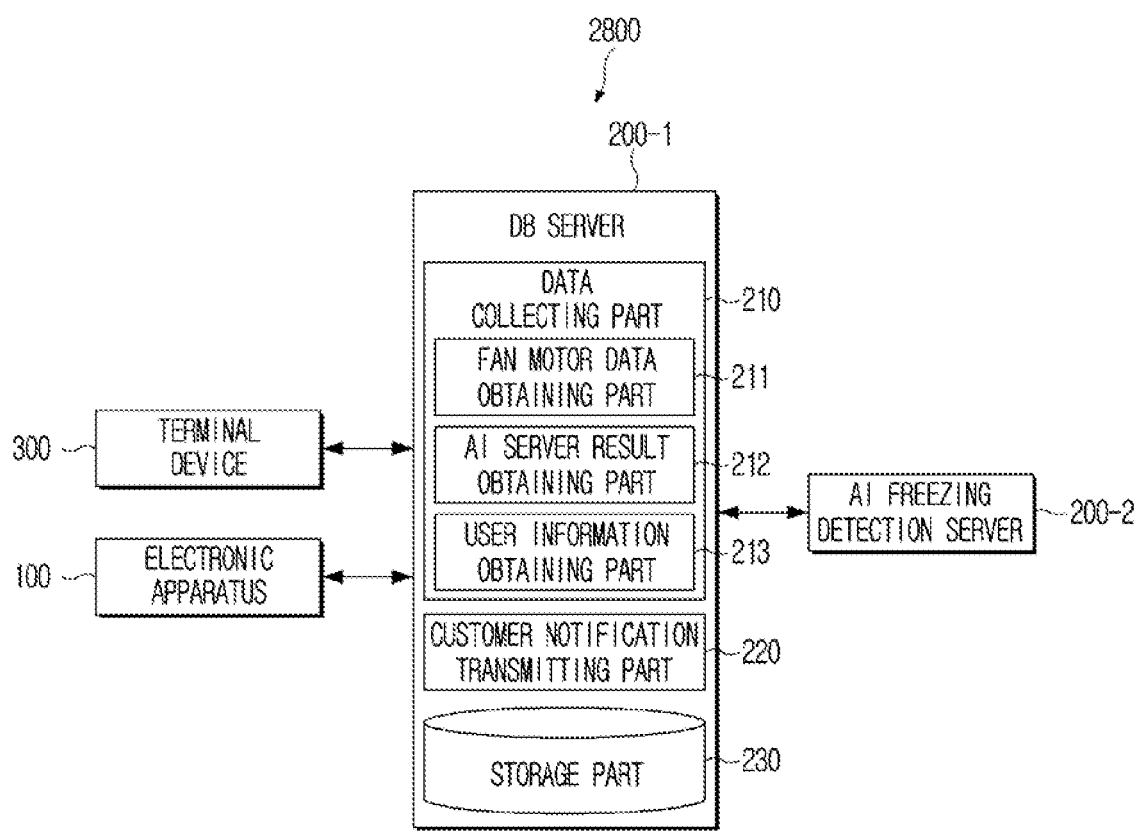
FIG. 28 is a system diagram illustrating an operation of an external server according to another embodiment.

FIG. 28 is a system diagram illustrating an operation of the external server 200 according to another embodiment.

Referring to FIG. 28, a system 2800 may include the electronic apparatus 100, the DB server 200-1, the artificial intelligence freezing detection server 200-2, and the terminal device 300. The operation of FIG. 28 is an actualization of the operation of FIG. 27. Accordingly, redundant descriptions thereof will be omitted.

The DB server 200-1 may include a data collecting part 210, a customer notification transmitting part 220, and a storage part 230.

The data collecting part 210 may include at least one from among a fan motor data obtaining part 211, an artificial intelligence (AI) server result obtaining part 212, or a user information obtaining part 213. Here, the fan motor data obtaining part 211 may be configured to store data associated with the fan motor obtained from the electronic apparatus 100. The artificial intelligence server result obtaining part 212 may be configured to store the notification information transmitted from the artificial intelligence freezing detection server 200-2. Here, the artificial intelligence server result obtaining part 212 may be configured to store the notification information transmitted from the artificial intelligence freezing detection server 200-2. The user information obtaining part 213 may be configured to store information associated with at least one user from among the user of the electronic apparatus 100 or the user of the terminal device 300.

The customer notification transmitting part 220 may be configured to perform a function of transmitting the notification information received from the artificial intelligence freezing detection server 200-2 to the terminal device 300.

The storage part 230 may be configured to store information of a different type from the fan motor data, the notification information, and the user information.

Figure 29:
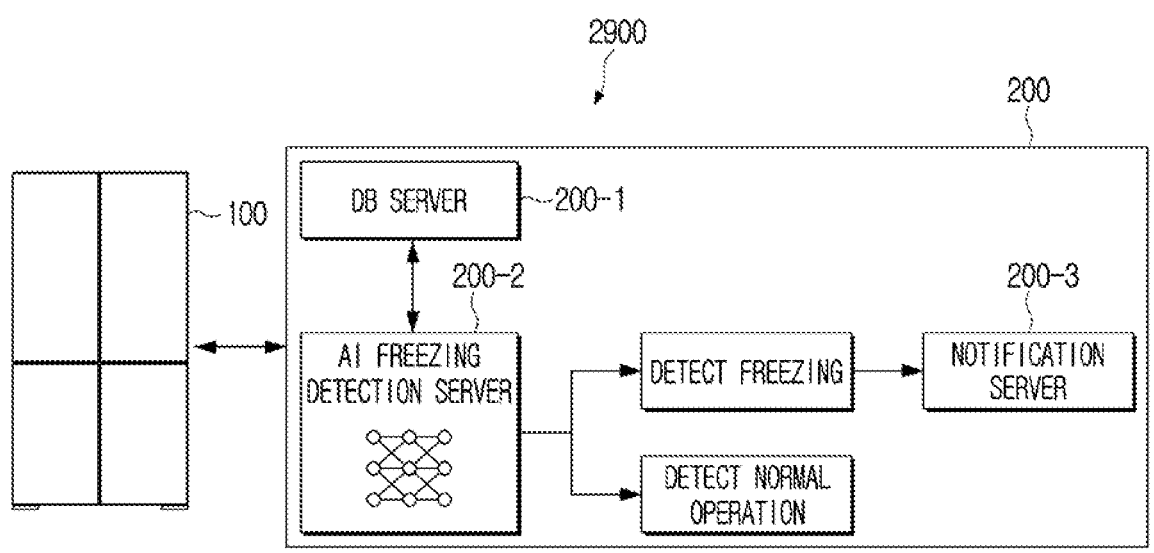
FIG. 29 is a system diagram illustrating an operation of an eternal server according to still another embodiment.

FIG. 29 is a system diagram illustrating an operation of the eternal server 200 according to still another embodiment.

Referring to FIG. 29, a system 2900 may include the electronic apparatus 100 and the external server 200. The external server 200 may include at least one from among the DB server 200-1, the artificial intelligence freezing detection server 200-2, or a notification server 200-3.

Because the DB server 200-1 and the artificial intelligence freezing detection server 200-2 have been described in FIG. 27 and FIG. 28, redundant descriptions thereof will be omitted.

In FIG. 27 and FIG. 28, the artificial intelligence freezing detection server 200-2 has been described as obtaining both the freezing degree and notification information corresponding to the freezing degree. However, in the embodiment of FIG. 29, the artificial intelligence freezing detection server 200-2 may be configured to obtain only the freezing degree, and the notification information may be obtained from the notification server 200-3.

Specifically, the artificial intelligence freezing detection server 200-2 may determine whether the fan motor is frozen according to the freezing degree. Then, based on the freezing degree being greater than or equal to the threshold value, the artificial intelligence freezing detection server 200-2 may transmit the freezing degree to the notification server 200-3. Here, the notification server 200-3 may obtain notification information corresponding to the freezing degree received from the artificial intelligence freezing detection server 200-2. Then, the notification server 200-3 may transmit the obtained notification information to the electronic apparatus 100.

FIG. 30 is a flowchart illustrating a controlling method of the electronic apparatus 100 according to an embodiment.

Referring to FIG. 30, a controlling method of the electronic apparatus may include obtaining data associated with the fan motor of the electronic apparatus (S3005), obtaining the freezing degree of the fan motor by inputting the obtained data associated with the fan motor to the artificial intelligence model trained to output the freezing degree of the fan motor based on the data associated with the fan motor being input (S3010), identifying whether to perform the operation corresponding to the freezing of the fan motor based on the obtained freezing degree (S3015), and providing, based on identifying that the operation corresponding to the freezing of the fan motor is to be performed, notification information (S3020).

The controlling method may further include performing, based on the obtained freezing degree being greater than or equal to the threshold value, the operation corresponding to the freezing of the fan motor.

The operation corresponding to the freezing of the fan motor may include at least one from among the operation for providing notification information or the operation for executing the defrosting function.

The controlling method may further include executing, based on the obtained freezing degree being greater than or equal to the threshold value, the defrosting function by supplying a heat source to the fan motor to remove freezing generated at the fan motor.

The data associated with the fan motor may include at least one from among the duty cycle, the driving voltage, the power consumption, the rotation speed, or the wind strength of the fan motor.

The notification information may include at least one from among the freezing information, the guide information on the defrosting function, the execution information on the defrosting function, or failure information, the freezing information may include at least one from among the freezing degree or the estimated freezing time, the guide information on the defrosting function may include guide information for selecting whether to execute the defrosting function, and the execution information on the defrosting function may include at least one from among the information showing that the defrosting function is being executed and the estimated defrosting complete time.

The providing the notification information (S3020) may include providing, based on the obtained freezing degree being greater than or equal to the first threshold value and less than the second threshold value, the freezing information.

The providing the notification information (S3020) may include providing, based on the obtained freezing degree being greater than or equal to the second threshold value and less than the third threshold value, the guide information on the defrosting function, and the controlling method may further include executing, based on the user input being received based on the guide information, the defrosting function.

The providing the notification information (S3020) may include providing, based on the defrosting function being executed, the execution information on the defrosting function.

The controlling method may further include executing, based on the obtained freezing degree being greater than or equal to the third threshold value and less than the fourth threshold value, the defrosting function, and the providing the notification information (S3020) may include providing, based on the obtained freezing degree being greater than or equal to the fourth threshold value, the failure information.

The controlling method of the electronic apparatus 100 as in FIG. 30 may be executed on the electronic apparatus 100 having the configurations of FIG. 2 or FIG. 3, and executed even on the electronic apparatus 100 having other configurations.

The methods according to the various embodiments of the disclosure described above may be implemented in an application form installable to an electronic apparatus of the related art.

In addition, the methods according to the various embodiments of the disclosure described above may be implemented with only a software upgrade or a hardware upgrade on the electronic apparatus of the related art.

In addition, the various embodiments of the disclosure described above may be performed through an embedded server provided in the electronic apparatus, or an external server of at least one from among the electronic apparatus and a display device.

According to an embodiment of the disclosure, the various embodiments described above may be implemented with software including instructions stored in a machine-readable storage media (e.g., computer). The machine may call an instruction stored in the storage medium, and as a device capable of operating according to the called instruction, may include an electronic device according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment of the disclosure, a method according to the various embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program may be at least stored temporarily in a storage medium such as a server of a manufacturer, a server of an application store, or a memory of a relay server, or temporarily generated.

In addition, respective elements (e.g., a module or a program) according to various embodiments described above may be comprised as a single entity or a plurality of entities, and some sub-elements of the abovementioned corresponding sub-elements may be omitted, or different sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with the various embodiments, may be performed sequentially, in a parallel, repetitively, or in a heuristically manner, or at least some operations may be performed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
   a memory configured to store an artificial intelligence model; and
   a processor configured to:
      obtain data associated with a fan motor of the electronic apparatus;
      obtain a freezing degree of the fan motor by inputting the obtained data associated with the fan motor to the artificial intelligence model which is trained to output the freezing degree of the fan motor based on the inputting of the obtained data associated with the fan motor;
      identify whether to perform an operation in relation to the obtained freezing degree of the fan motor; and
      provide, based on identifying that the operation in relation to the obtained freezing degree of the fan motor is to be performed, notification information.

2. The electronic apparatus of claim 1, wherein the processor is configured to perform, based on the obtained freezing degree of the fan motor being greater than or equal to a threshold value, the operation.

3. The electronic apparatus of claim 2, wherein the operation comprises at least one from among an operation of providing the notification information which pertains to a freezing status of the fan motor or an operation of executing a defrosting function.

4. The electronic apparatus of claim 3, further comprising:
   the fan motor,
   wherein the processor is configured to execute, based on the obtained freezing degree of the fan motor being greater than or equal to the threshold value, the defrosting function by supplying heat from a heat source to the fan motor to remove freezing generated at the fan motor.

5. The electronic apparatus of claim 1, wherein the data associated with the fan motor comprises at least one from among a duty cycle, a driving voltage, a power consumption, a rotation speed, or a wind strength of the fan motor.

6. The electronic apparatus of claim 1, wherein the notification information comprises at least one from among freezing information, guide information on a defrosting function, execution information on a defrosting function, or failure information,
   the freezing information comprises at least one from among a freezing degree or an estimated freezing time,
   the guide information on the defrosting function comprises guide information to select whether to execute the defrosting function, and
   the execution information on the defrosting function comprises at least one from among information showing that the defrosting function is being executed and an estimated defrosting complete time.

7. The electronic apparatus of claim 6, wherein the processor is configured to provide, based on the obtained freezing degree of the fan motor being greater than or equal to a first threshold value and less than a second threshold value, the freezing information.

8. The electronic apparatus of claim 6, wherein the processor is configured to provide, based on the obtained freezing degree of the fan motor being greater than or equal to the second threshold value and less than a third threshold value, the guide information on the defrosting function, and
   execute, based on a user input being received based on the guide information, the defrosting function.

9. The electronic apparatus of claim 8, wherein the processor is configured to provide, based on the defrosting function being executed, the execution information on the defrosting function.

10. The electronic apparatus of claim 6, wherein the processor is configured to execute, based on the obtained freezing degree of the fan motor being greater than or equal to the third threshold value and less than a fourth threshold value, the defrosting function, and
    provide, based on the obtained freezing degree being greater than or equal to the fourth threshold value, the failure information.

11. A controlling method of an electronic apparatus, the controlling method comprising:
    obtaining data associated with a fan motor of the electronic apparatus;
    obtaining a freezing degree of the fan motor by inputting the obtained data associated with the fan motor to an artificial intelligence model which is trained to output the freezing degree of the fan motor based on the inputting of the obtained data associated with the fan motor;
    identifying whether to perform an operation in relation to the obtained freezing degree of the fan motor; and
    providing, based on identifying that the operation in relation to the obtained freezing of the fan motor is to be performed, notification information.

12. The controlling method of claim 11, further comprising:
    performing, based on the obtained freezing degree being greater than or equal to a threshold value, the operation.

13. The controlling method of claim 12, wherein the operation comprises at least one from among an operation of providing the notification information which pertains to a freezing status of the fan motor or an operation of executing a defrosting function.

14. The controlling method of claim 13, further comprising:
    executing, based on the obtained freezing degree being greater than or equal to the threshold value, the defrosting function by supplying heat from a heat source to the fan motor to remove freezing generated at the fan motor.

15. The controlling method of claim 11, wherein the data associated with the fan motor comprises at least one from among a duty cycle, a driving voltage, a power consumption, a rotation speed, or a wind strength of the fan motor.

\* \* \* \* \*